(12) United States Patent
Park et al.

(10) Patent No.: US 9,674,445 B2
(45) Date of Patent: Jun. 6, 2017

(54) PORTABLE APPARATUS AND METHOD FOR TAKING A PHOTOGRAPH BY USING WIDGET

(71) Applicant: Samsung Electronics Co., Ltd., Suwon-si, Gyeonggi-do (KR)

(72) Inventors: Hyebin Park, Seoul (KR); Semin Park, Seoul (KR); Jungwoo Choi, Suwon-si (KR); Kyoweon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/183,933

(22) Filed: Feb. 19, 2014

(65) Prior Publication Data

US 2014/0240579 A1    Aug. 28, 2014

(30) Foreign Application Priority Data

Feb. 28, 2013    (KR) .................. 10-2013-0022006

(51) Int. Cl.
*H04N 5/232* (2006.01)
*G06F 3/0481* (2013.01)
*G06F 3/0484* (2013.01)
*G06F 3/0488* (2013.01)

(52) U.S. Cl.
CPC ....... *H04N 5/23293* (2013.01); *G06F 3/0481* (2013.01); *G06F 3/0484* (2013.01); *G06F 3/0488* (2013.01); *G06F 3/04817* (2013.01)

(58) Field of Classification Search
CPC ............. H04N 1/00411; H04N 1/2125; H04N 1/2129; H04N 5/23293; G03B 13/02; G03B 2213/02; G06F 3/04817; G06F 3/0488; G06T 2210/32
USPC .............. 348/231.2, 231.99, 333.01–333.12; 715/700, 767, 837, 847, 864, 866, 977
See application file for complete search history.

(56) References Cited

U.S. PATENT DOCUMENTS

| | | | |
|---|---|---|---|
| 2003/0011683 A1 | 1/2003 | Yamasaki et al. | |
| 2008/0281878 A1* | 11/2008 | Scott ................ | G06F 17/30194 |
| 2010/0073518 A1 | 3/2010 | Yeh | |
| 2012/0009896 A1 | 1/2012 | Bandyopadhyay et al. | |
| 2012/0092509 A1 | 4/2012 | Kim | |
| 2012/0124079 A1 | 5/2012 | Kinsella | |

(Continued)

FOREIGN PATENT DOCUMENTS

| JP | 2007-249222 A | 9/2007 |
|---|---|---|
| KR | 10-2012-0038151 A | 4/2012 |

*Primary Examiner* — Lin Ye
*Assistant Examiner* — Chriss Yoder, III
(74) *Attorney, Agent, or Firm* — Jefferson IP Law, LLP

(57) ABSTRACT

A method and an apparatus for taking a photograph by using a widget are provided. The method includes displaying, on a touch screen, a widget including a storage location name corresponding to a storage location where an image photographed in a camera application is stored, a preview area which displays a photo image stored in the storage location, and a photographing button, changing the preview area to a view finder area in response to a first touch detected in the widget, photographing a subject displayed on the view finder area in response to a second touch detected in the photographing button, and storing a photographed image corresponding to the subject in the storage location.

36 Claims, 22 Drawing Sheets

(56) References Cited

U.S. PATENT DOCUMENTS

| | | | |
|---|---|---|---|
| 2012/0163659 A1* | 6/2012 | Asakura | H04N 5/23216 |
| | | | 382/103 |
| 2012/0216139 A1* | 8/2012 | Ording | G06F 3/0488 |
| | | | 715/773 |
| 2012/0233571 A1 | 9/2012 | Wever et al. | |
| 2012/0287154 A1 | 11/2012 | Yook et al. | |
| 2012/0307126 A1* | 12/2012 | Bhogal | 348/333.11 |
| 2014/0195990 A1* | 7/2014 | Jegal et al. | 715/863 |

\* cited by examiner

PORTABLE APPARATUS AND METHOD FOR TAKING A PHOTOGRAPH BY USING WIDGET

CROSS-REFERENCE TO RELATED APPLICATION(S)

This application claims the benefit under 35 U.S.C. §119(a) of a Korean patent application filed on Feb. 28, 2013 in the Korean Intellectual Property Office and assigned Serial number 10-2013-0022006, the entire disclosure of which is hereby incorporated by reference.

TECHNICAL FIELD

The present disclosure relates to a method and an apparatus for taking a photograph by using a widget. More particularly, the present disclosure relates to a method and an apparatus for taking a photograph by using a camera widget where a location for storing the photographed image is set.

BACKGROUND

Recently, various services and functions provided in a portable device are gradually extended. In order to enhance the utility value of such a portable terminal and perform various functions, various applications executable in the portable terminal are developed.

Accordingly, one or more applications may be installed in a portable device which may be movable and has a touch screen, such as a smart phone, a mobile phone, a notebook Personal Computer (PC), a tablet PC, and the like. Users take photographs to which various scene modes and image effects are applied through camera applications installed in the portable terminal. The photographed image is stored in a certain folder (e.g., a Data Center Infrastructure Management (DCIM) folder) without a user selection in an internal memory of the portable device or an external memory, such as a memory card, and the like. The user may arrange photographs stored in a certain folder of the portable device by using a separate application or a desktop computer connected in a wired or a wireless manner.

It is an inconvenience for the user to create a folder for each date and place for photo management, or to apply various photo effects (e.g., an indoor mode, black and white, inversion, and the like) after taking photographs.

Therefore, a need exists for a method and an apparatus for taking a photograph by using a camera widget where a location for storing the photographed image is set.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for taking a photograph by using a camera widget where a location for storing a photographed image is set.

Another aspect of the present disclosure is to provide a method and an apparatus for taking a photograph by using a camera widget where a photographed image is stored in a set location by applying an environment setting.

Another aspect of the present disclosure is to provide a method and an apparatus for taking a photograph by using a camera widget including a location for storing a photographed image, a preview area, and a photographing button.

Another aspect of the present disclosure is to provide a method and an apparatus for taking a photograph by using a camera widget including a storage location where a photographed image is stored and a camera widget button.

In accordance with an aspect of the present disclosure, a method for photographing an image by using a widget of a portable device is provided. The method includes displaying, on a touch screen, a widget including a storage location name corresponding to a storage location where an image photographed in a camera application is stored, a preview area which displays a photo image stored in the storage location, and a photographing button, changing the preview area to a view finder area in response to a first touch detected in the widget, photographing a subject displayed on the view finder area in response to a second touch detected in the photographing button, and storing a photographed image corresponding to the subject in the storage location. The photographing of the subject includes photographing the subject by applying an environment setting.

In accordance with another aspect of the present disclosure, a method for photographing an image by using a widget of a portable device is provided. The method includes displaying, on a touch screen, a widget including a storage location name corresponding to a storage location where an image photographed in a camera application is stored, and a camera widget button, displaying the camera application in response to a first touch detected in the camera widget button, photographing a subject by using a photographing button of the executed camera application, and storing a photographed image corresponding to the subject in the storage location. The photographing of the subject includes photographing the subject by applying an environment setting.

In accordance with another aspect of the present disclosure, a portable device is provided. The portable device includes a touch screen configured to display a widget, a camera unit, and a controller configured to control the touch screen and the camera unit, to display, on the touch screen, a widget including a storage location name corresponding to a storage location where an image photographed in a camera application is stored, and a camera application button, to photograph a subject by using the camera unit and a photographing button in the camera application displayed in response to a first touch detected in the camera application button, and to store the photographed subject in the storage location.

In accordance with another aspect of the present disclosure, a portable device is provided. The portable device includes a touch screen configured to display a widget, a camera unit, and a controller configured to control the touch screen and the camera unit, to display, on the touch screen, a widget including a storage location name corresponding to a storage location where an image photographed in a camera application is stored, a preview area which displays a photo image stored in the storage location, and a photographing button, to change the preview area to a view finder area in response to a first touch detected in the photographing button, to photograph a subject displayed on the view finder area by using the photographing button and the camera unit, and to store the photographed subject in the storage location.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
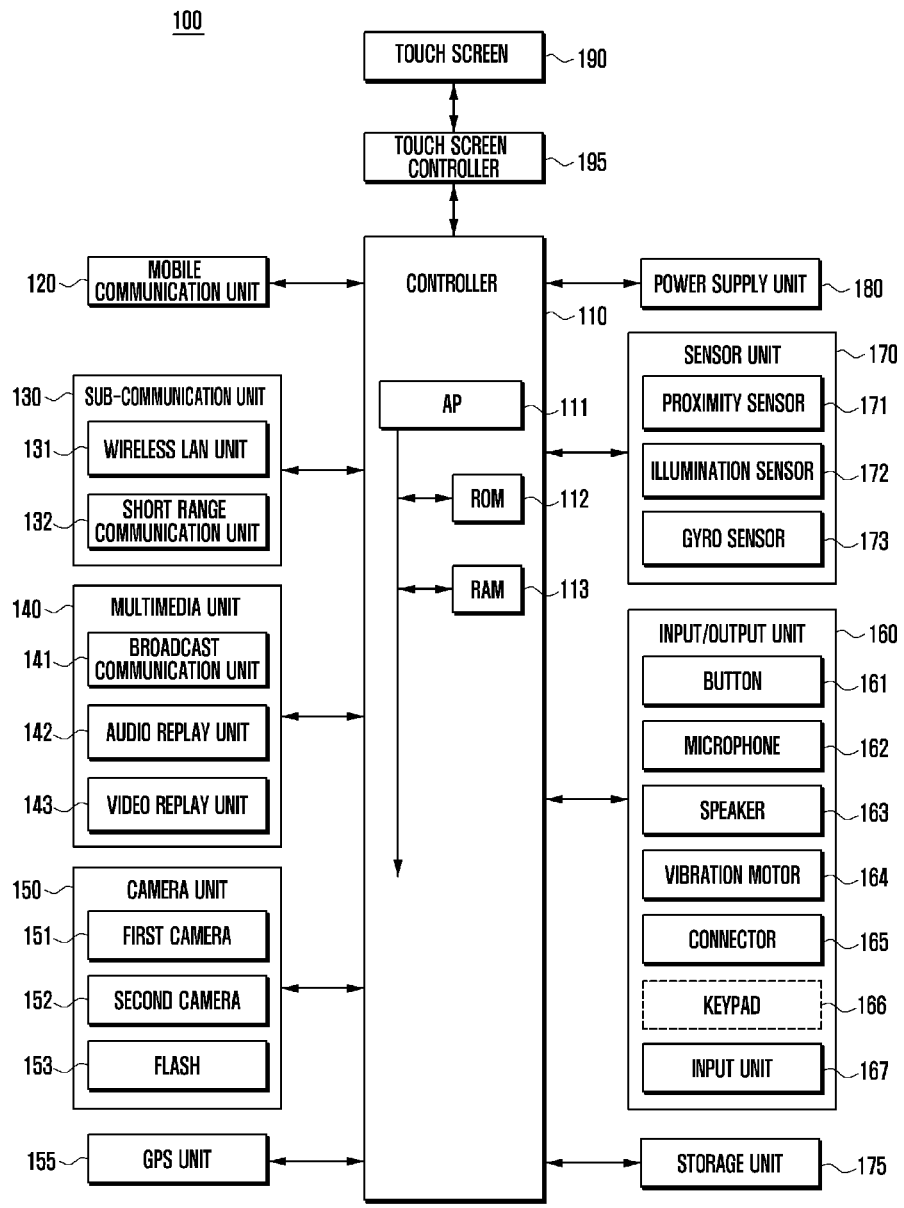
FIG. 1 is a block diagram schematically illustrating a portable device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

A widget refers to a mini application which is one of Graphical User Interfaces (GUI) which more smoothly supports interaction between a user and an application or an operating system. Some examples of the widget are a weather widget, a calculator widget, a clock widget, and the like. The widget may be formed in a shortcut icon form to be installed in a desktop computer, a portable device, a blog, a café, a personal homepage, and the like, and the service may be directly available by clicking on the widget without using a web browser. Further, the widget may include a shortcut to a designated path or a shortcut icon which may execute a designated application.

An application refers to software which may be executed on an operating system and may be directly used by the user. For example, the application may include a word processor, a spreadsheet, a media player, and the like.

The terms used in the present specification are not intended to limit the scope of rights of the present disclosure. A singular expression may include a plural expression unless clearly stated otherwise. Such terms as "include" or "have" of the present specification are intended to designate the existence of characteristics, numbers, steps, operations, components, parts, or combinations thereof, but should be understood not to exclude the possibility of the existence or additions of one or more other characteristics, numbers, steps, operations, components, parts, or combinations thereof.

FIG. 1 is a block diagram schematically illustrating a portable device according to an embodiment of the present disclosure.

Referring to FIG. 1, a portable device 100 may be connected to an external device (not shown) by using a mobile communication unit 120, a sub-communication unit 130, and a connector 165. The "external device" may include another portable device (not shown), a mobile phone (not shown), a smartphone (not shown), an input unit (not shown), a tablet Personal Computer (PC) (not shown), a server (not shown), and the like. The portable device may transmit and receive data, and may include at least one touch screen. Such a portable device may include a mobile phone, a smart phone, a tablet PC, a 3 Dimensional Television (3D-TV), a smart TV, a Light Emitting Diode (LED) TV, a Liquid Crystal Display (LCD) TV, and the like, and may also include a device which may transmit and receive data with a peripheral device or another remotely located device.

The portable device 100 includes a touch screen 190 and a touch screen controller 195. Further, the portable device 100 includes a controller 110, the mobile communication unit 120, the sub-communication unit 130, a multimedia unit 140, a camera unit 150, a Global Positioning Satellite (GPS) unit 155, an input/output unit 160, a sensor unit 170, a storage unit 175, and a power supply unit 180. The sub-communication unit 130 includes at least one of a wireless Local Area Network (LAN) unit 131 or a short range communication unit 132, and the multimedia unit 140 includes at least one of a broadcast communication unit 141, an audio replay unit 142, or a video replay unit 143. The camera unit 150 includes at least one of a first camera 151 or a second camera 152, an input/output unit 160 includes at least one of a button 161, a microphone 162, a speaker 163, a vibration motor 164, the connector 165, a keypad 166, or an input unit 167, and the sensor unit 170 includes a proximity sensor 171, an illumination sensor 172, and a gyro sensor 173.

The controller 110 may include an application processor (AP) 111, a Read Only Memory (ROM) 112 which stores a control program for controlling the portable device 100, and a Random Access Memory (RAM) 113 which stores signals or data inputted from an external of the portable device 100 or is used as a memory area for a work performed in the portable device 100.

The controller 110 controls overall operation of the portable device 100 and a signal flow between internal components 120 to 195 of the portable device 100, and processes data. The controller 110 controls power supply to the internal components 120 to 195 from the power supply unit 180. Further, the controller 110 executes the operating system and application which are stored in the storage unit 175.

The AP 111 may include a Graphical Processing Unit (GPU) (not shown) for processing graphics. The AP 111 may be configured with a System On Chip (SOC) type where a core (not shown) and GPU (not shown) are integrated. The AP 111 may include a single core, a dual core, a triple core, a quad core, and a multiple core. Further, the AP 111, the ROM 112, and the RAM 113 may be connected through an internal bus.

The controller 110 may control the mobile communication unit 120, the sub-communication unit 130, the multimedia unit 140, the camera unit 150, the GPS unit 155, the input/output unit 160, the sensor unit 170, the storage unit 175, the power supply unit 180, the touch screen 190, and the touch screen controller 195.

The controller 110 may be configured to display a widget including a storage location name corresponding to a storage location where an image taken by the camera application is stored, a preview area which displays a photo image previously stored in the storage location, and a photographing button on the touch screen, to change the preview area to a view finder area in response to a first touch detected in the widget, to photograph a subject displayed on the view finder area in response to a second touch detected in the photographing button, and to store the photographed image in the storage location.

The controller 110 may be configured to rotate the widget according to the rotation of the portable device.

The controller 110 may be configured to rotate at least one of the storage location name, the preview area, and the photographing button of the widget according to the rotation of the portable device.

The controller 110 may be configured to photograph the subject by applying an environment setting.

The controller 110 may be configured to move the storage location of the photographed image in response to a third touch detected in the preview area.

The controller 110 may be configured to change the photographing button in response to the first touch detected in the widget.

The controller 110 may be configured to reduce a size of the photographed image and display the image at one side of the photographing button.

The controller 110 may control the preview area to be located between the storage location name and the photographing button in the widget.

The controller 110 may be configured to display a widget including a storage location name corresponding to the storage location where an image taken in the camera application is stored and a camera widget button on the touch screen, to display the camera application in response to the first touch detected in the camera widget button, and to store the photographed image in the storage location by photographing the subject by using the photographing button of the executed camera application.

The controller 110 may be configured to move the environment setting screen, which displays the environment setting of the camera application, in response to the second touch, and to display the environment setting with a separate screen which is different from the current screen of the widget.

The controller 110 may be configured to display the environment setting screen adjacent to the widget.

The controller 110 may be configured to move the storage location of the photographed image corresponding to the storage location name in response to the third touch detected in the widget.

The controller 110 may be configured to generate the widget having a setting related to the storage location and the environment setting on the touch screen, and to display the widget which reflects the storage location and the environment setting.

The mobile communication unit 120 enables the portable device 100 to be connected to the external device through a mobile communication by using one or a plurality of antennas (not shown) under the control of the controller 110. The mobile communication unit 120 transmits and receives wireless signals for a voice call, a video call, a Short Message Service (SMS), a Multimedia Message Service (MMS), and data communication with a mobile phone (not shown), a smart phone (not shown), a tablet PC, another portable device (not showing) having a phone number which is input to the portable device 100, and the like.

The sub-communication unit 130 may include at least one of a wireless LAN unit 131 or the short range communication unit 132. For example, the sub-communication unit 130 may include the wireless LAN unit 131 or the short range communication unit 132, or both the wireless LAN unit 131 and the short range communication unit 132.

The wireless LAN unit 131 may be wirelessly connected to the Internet in a place where an Access Point (AP) (not shown) is installed, under the control of the controller 110. The wireless LAN unit 131 supports the wireless LAN standard IEEE 802.11x of Institute of Electrical and Electronic Engineers (IEEE). The short range communication unit 132 may wirelessly perform a short range communication between the portable device 100 and the external device. The short range communication may include Bluetooth, an Infrared Data Association (IrDA), a Near Field Communication (NFC), and the like.

The portable device 100 may include at least one of the mobile communication unit 120, the wireless LAN unit 131, or the short range communication unit 132 depending on the performance. For example, the portable device 100 may include a combination of the mobile communication unit 120, the wireless LAN unit 131, and the short range communication unit 132 depending on the performance.

In various embodiments of the present disclosure, the term "communication unit" includes the mobile communication unit 120 and the sub-communication unit 130. The communication unit may receive device information of the input unit 167 from the input unit 167 under the control of the controller 110.

The multimedia unit 140 may include the broadcast communication unit 141, the audio replay unit 142, or the video replay unit 143. The broadcast communication unit 141 may receive a broadcast signal, such as a TV broadcast signal, a radio broadcast signal, a data broadcast signal, and the like, and additional broadcast information, such as an Electric Program Guide (EPS), an Electric Service Guide (EGS), and the like, which are transmitted from an external broadcasting station through a broadcast communication antenna (not shown), and replay the received signal and information by using a video codec unit (not shown) and an audio codec unit (not shown).

The audio replay unit 142 may replay the audio source (e.g., an audio file whose file extension is mp3, wma, ogg or wave), which is previously stored in the storage unit 175 of the portable device or is received from an external side of the portable device 100, by using the audio codec unit under the control of the controller 110.

Figure 5A:
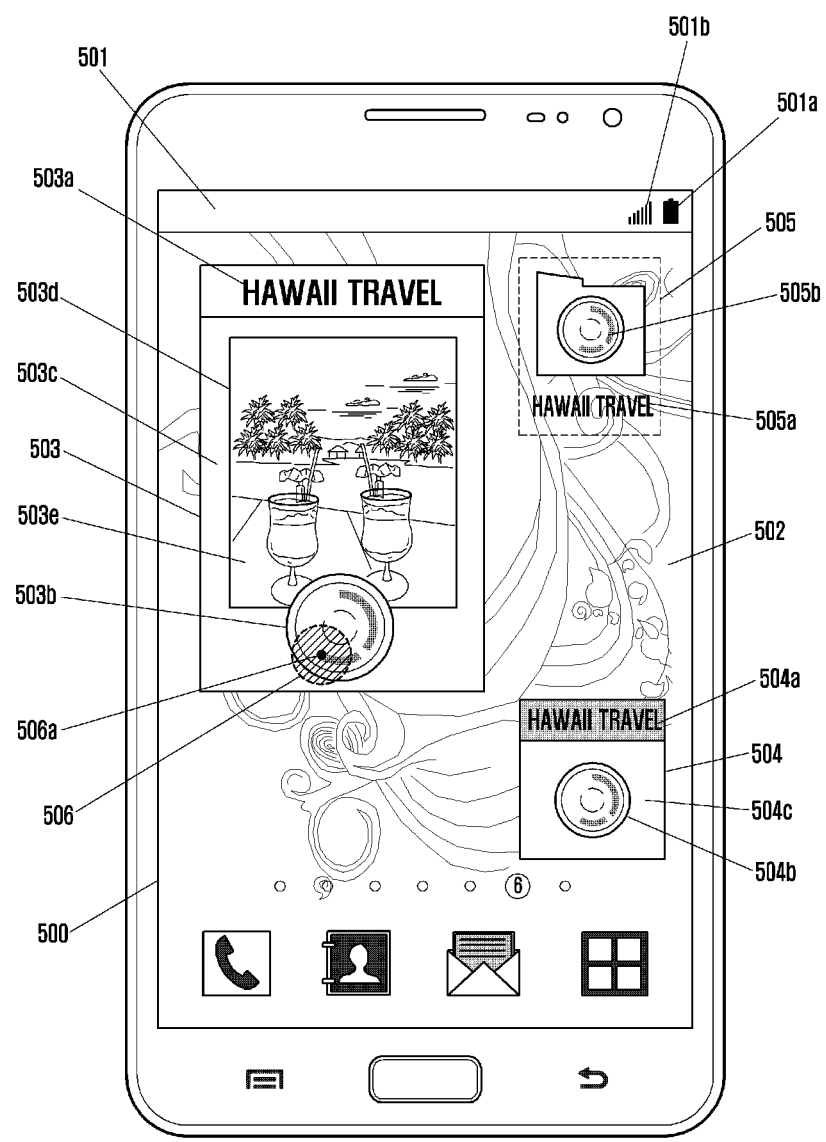
FIGS. 5A, 5B, 5C, 5D, 5E, and 5F illustrate photographs taken by a portable device according to an embodiment of the present disclosure.
Figure 5B:
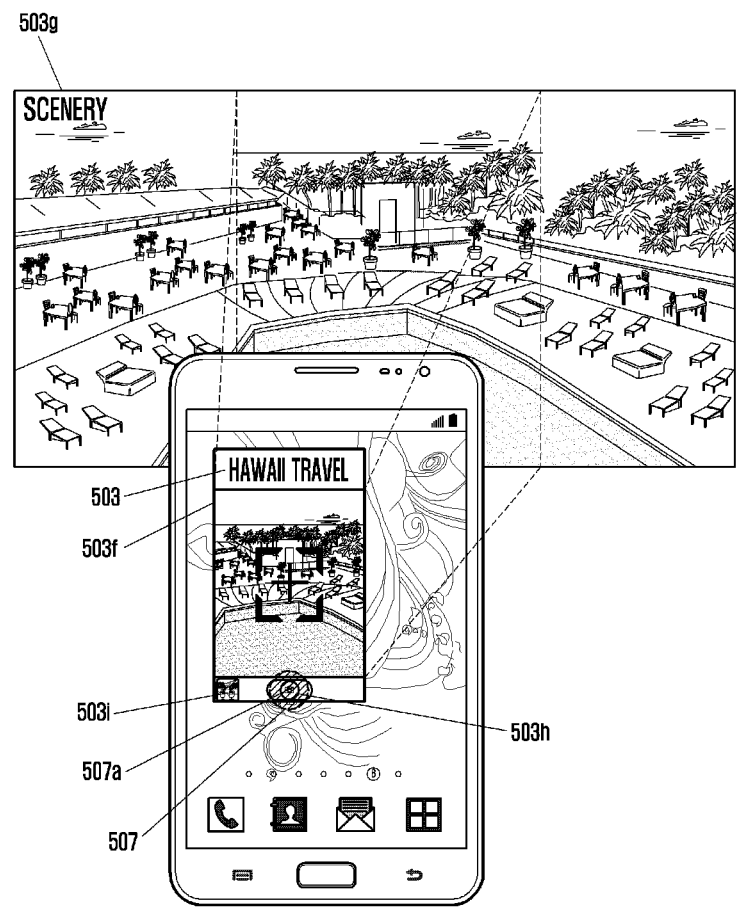
Figure 7A:
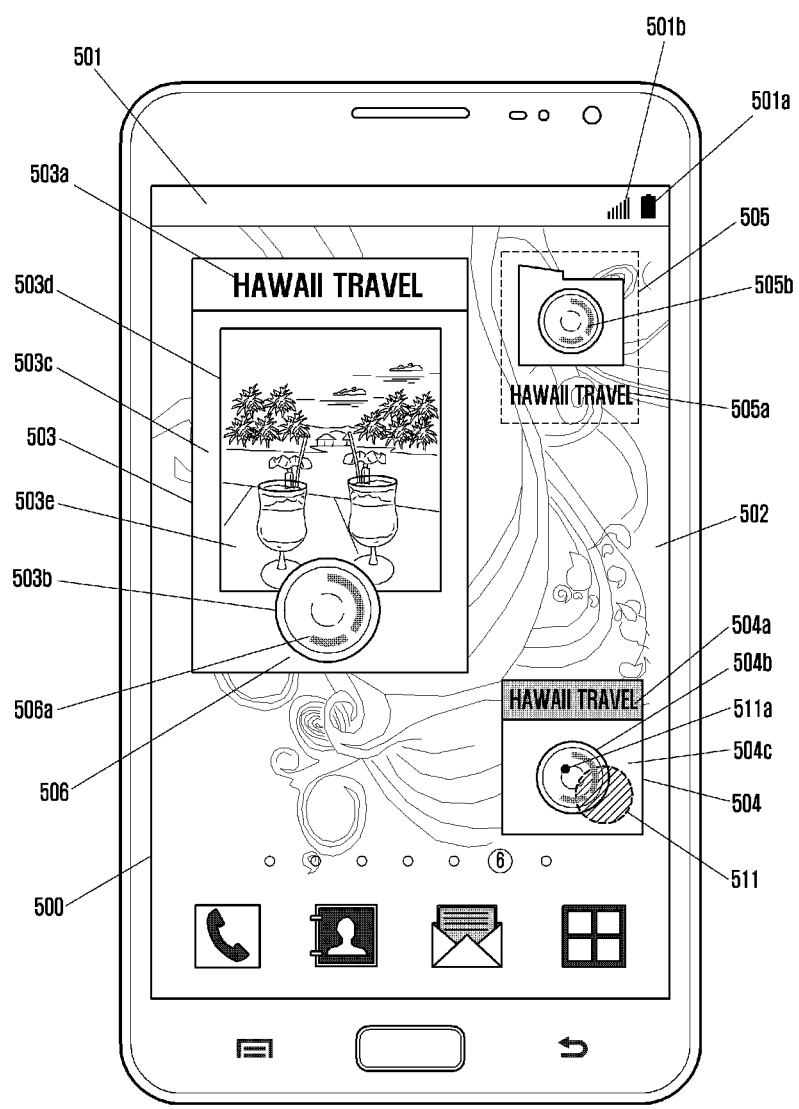
FIGS. 7A and 7B illustrate methods of taking photographs of a portable device according to an embodiment of the present disclosure.
Figure 7B:
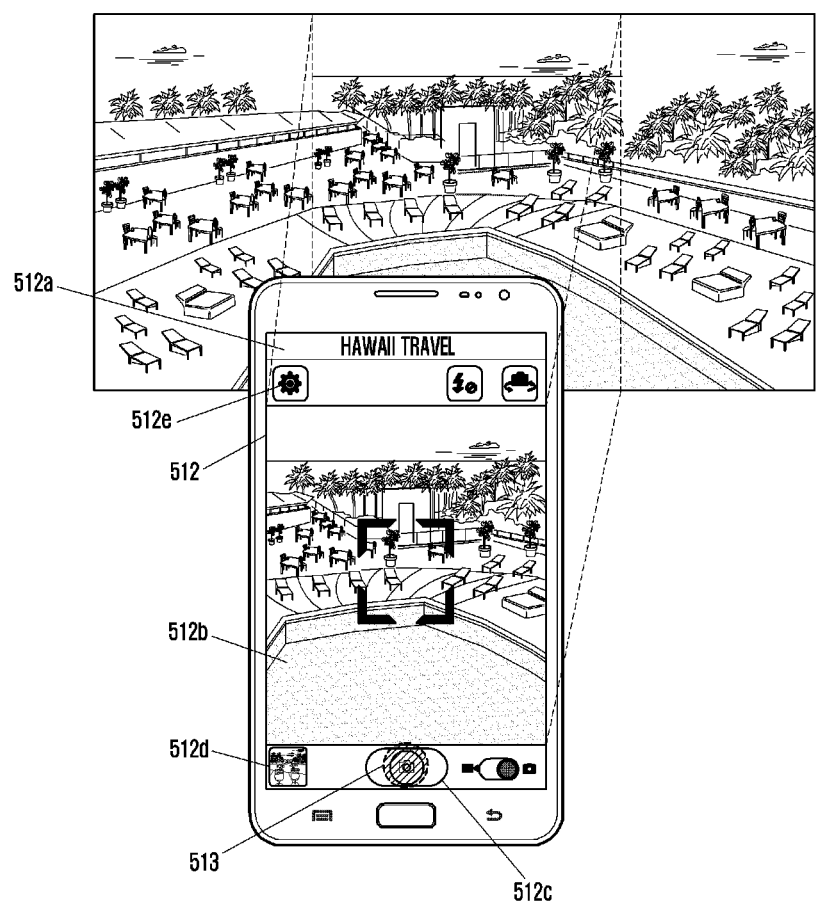
Figure 9A:
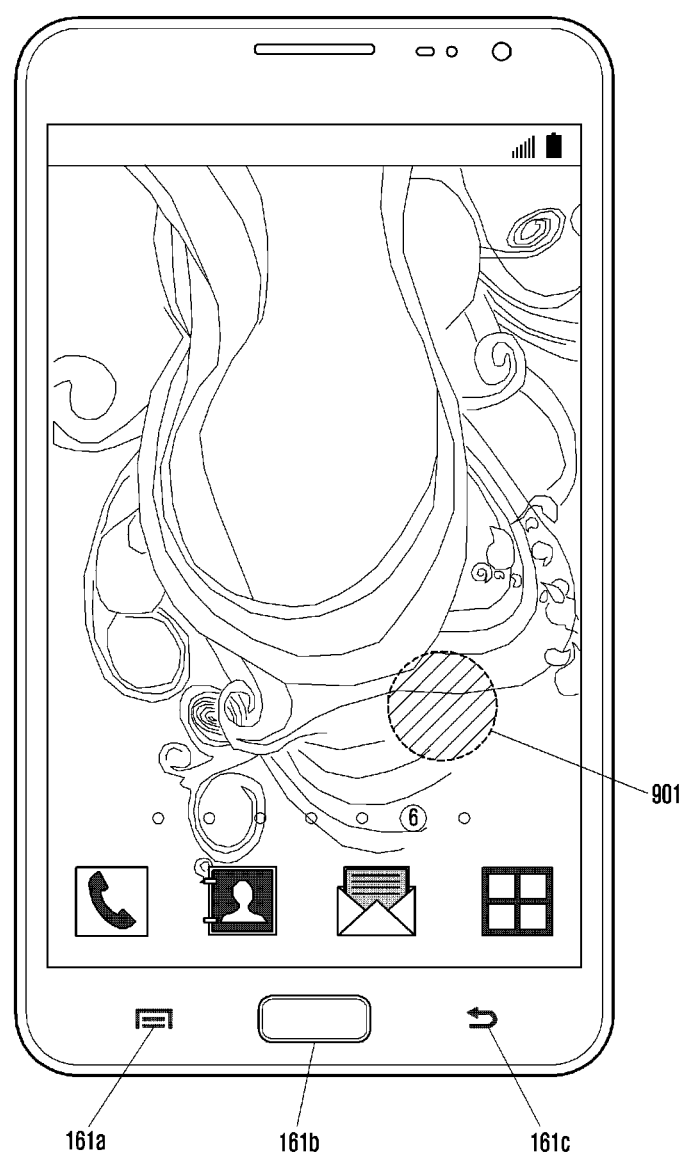
FIGS. 9A, 9B, 9C, 9D, 9E, and 9F illustrate a photographing setting of a portable device according to an embodiment of the present disclosure.
Figure 9B:
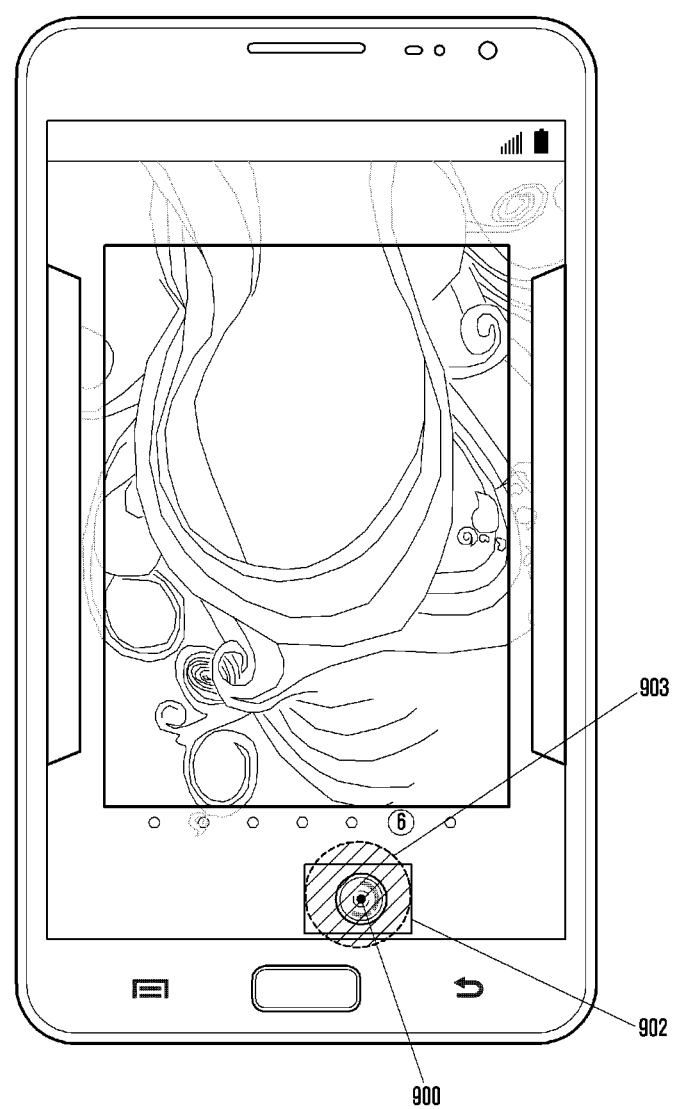
Figure 9C:
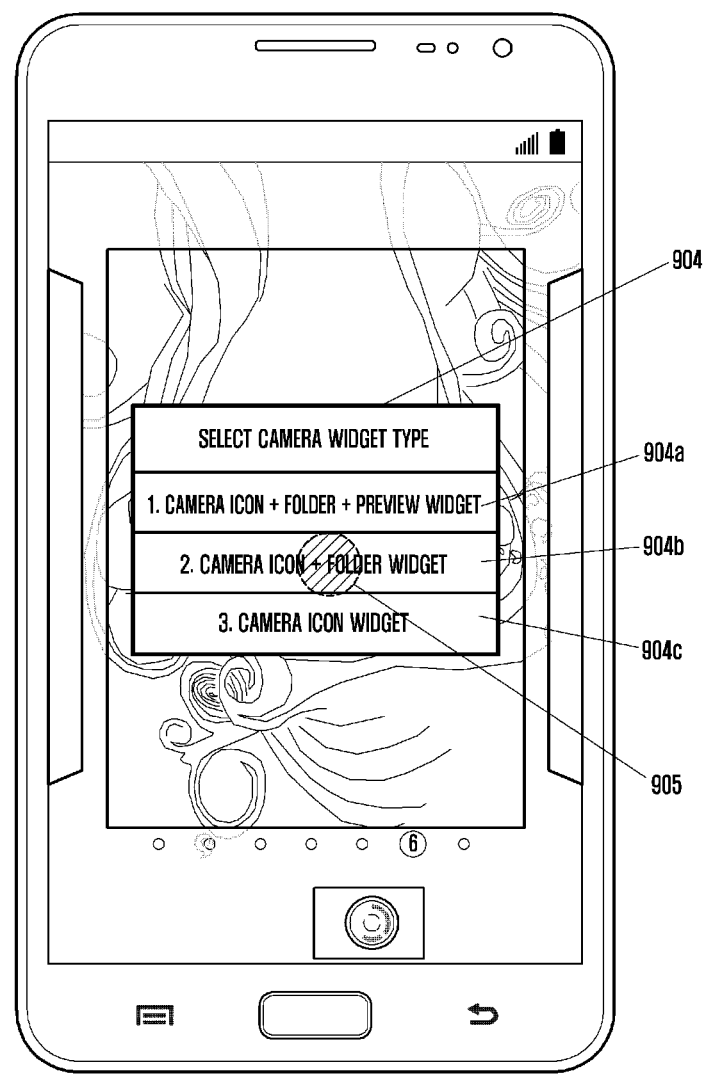
Figure 9D:
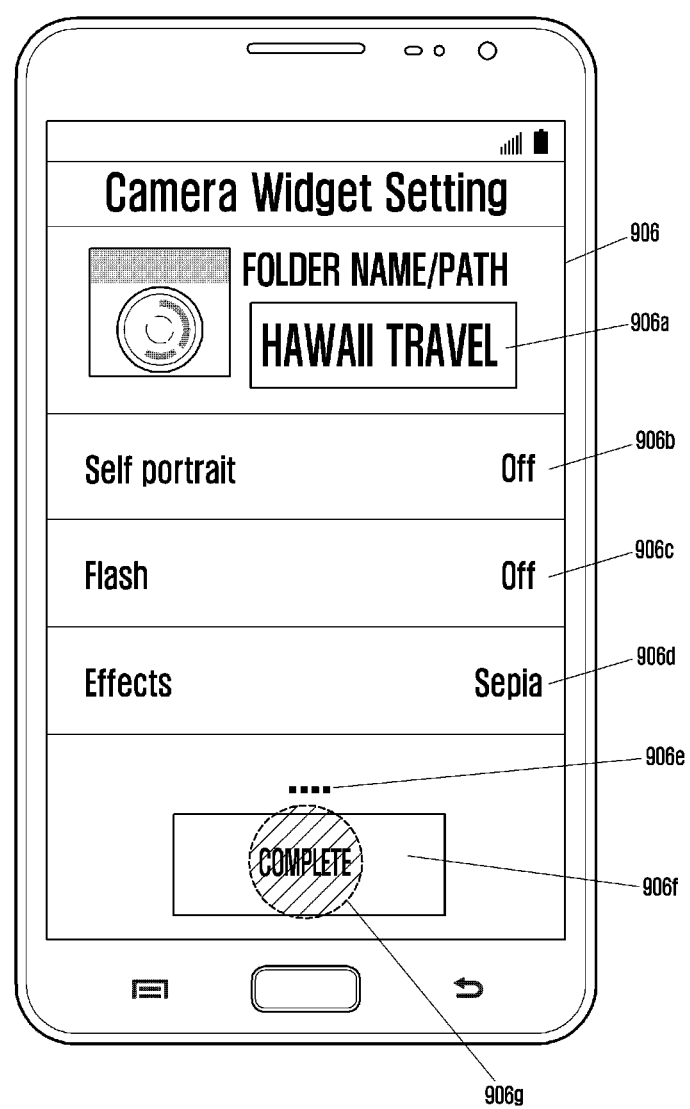

The audio replay unit 142 may replay the auditory feedback (e.g., the output of the audio source which is previously stored in the storage unit) corresponding to the touch of camera widget buttons 503b, 504b, and 505b illustrated in FIG. 5A, and photographing buttons 503h illustrated in FIGS. 5B and 512c illustrated in FIG. 7B, and environment settings 904 illustrated in FIGS. 9C and 906 illustrated in FIG. 9D of the camera widget by using the audio codec unit.

The video replay unit 143 may replay a digital video file (e.g., a file whose file extension is mpeg, mpg, mp4, avi, mov, or mkv) which is previously stored in the storage unit 175 of the portable device 100 or is received from an external side of the portable device 100 by using a video codec unit under the control of the controller 110. Most of applications which can be installed in the portable device 100 may replay an audio and video file by using an audio codec unit or a video codec unit.

The video replay unit 143 may replay an audio source by using the video codec unit or the audio codec unit.

The multimedia unit 140 may include the audio replay unit 142 and the video replay unit 143 and not the broadcast communication unit 141. Further, the audio replay unit 142 or the video replay unit 143 of the multimedia unit 140 may be included in the controller 110. The term "video codec unit" in various embodiments of the present disclosure may include one or a plurality of video codec units. The term "audio codec unit" includes one or a plurality of audio codec units.

Figure 2:
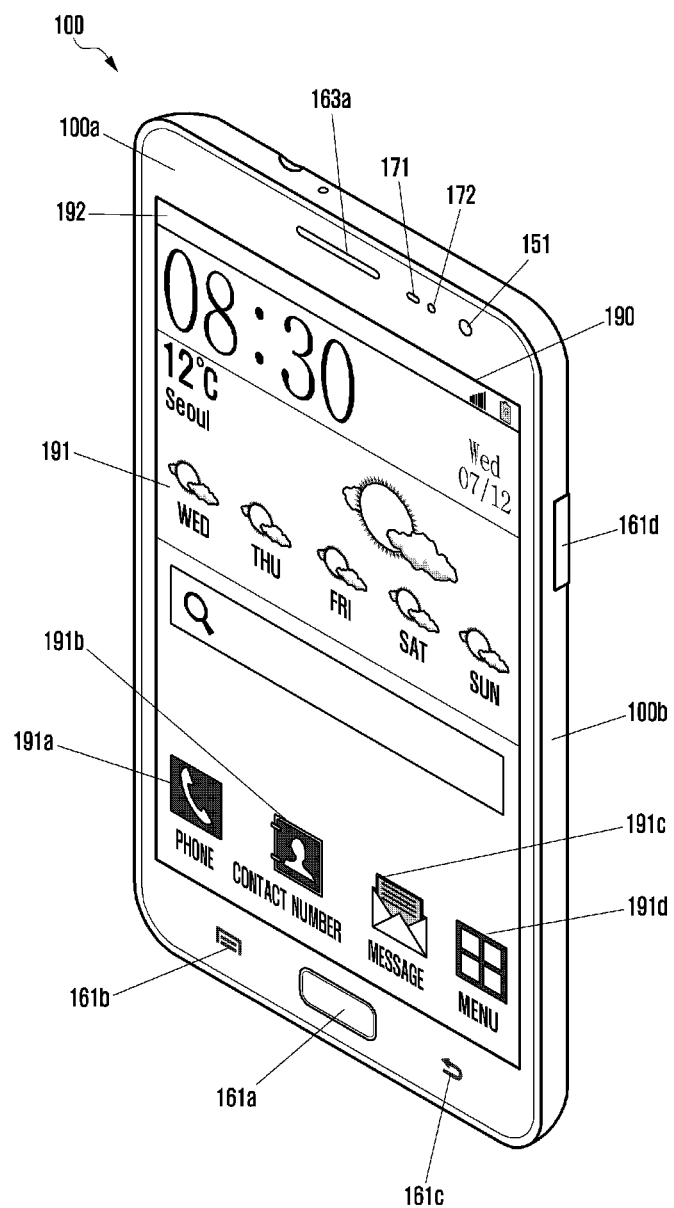
FIG. 2 is a front view schematically illustrating a portable device according to an embodiment of the present disclosure.
Figure 3:
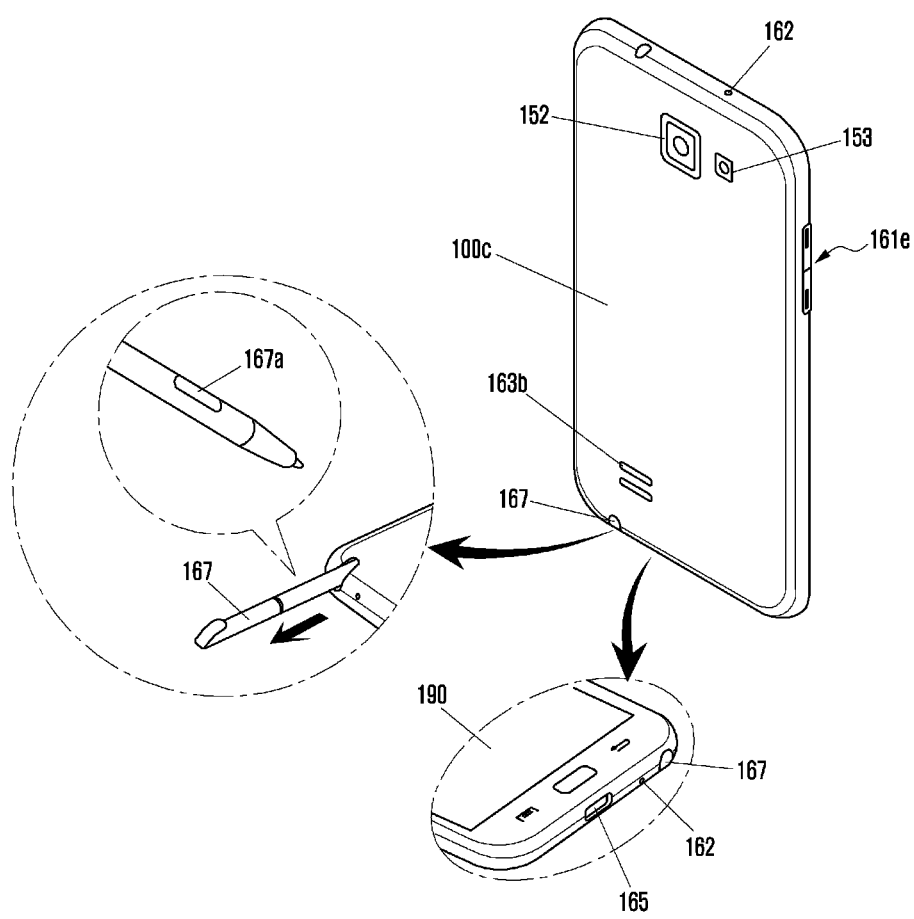
FIG. 3 is a rear view schematically illustrating a portable device according to an embodiment of the present disclosure.

The camera unit 150 may include at least one of the first camera 151 of a front side 100a of FIG. 2 and the second camera 152 of a rear side 100c of FIG. 3, which take a still image or video under the control of the controller 110. The camera unit 150 may include one or both of the first camera 151 and the second camera 152. Further, the first camera 151 or the second camera 152 may include a secondary light source (e.g., a flash 153) which provides the amount of light needed in taking images.

The first camera 151 and the second camera 152 may be located adjacent to the additional camera (not shown) (e.g., the gap between the first camera 151 of the front side 100a of FIG. 2 or the second camera 152 of the rear side 100c of FIG. 3, and the additional camera (not shown) is between 2 cm and 8 cm), so that a three-dimensional still image or a three-dimensional video may be taken.

The GPS unit 155 periodically receives electric waves (e.g., accurate location information and time information of the GPS satellite (not shown)) from a plurality of GPS satellites (not shown) on the orbit of the earth. The portable device 100 may recognize the location, speed, and time of the portable device 100 by using the electric waves received from the plurality of GPS satellites (not shown).

The input/output unit 160 may include at least one of a plurality of buttons 161, a microphone 162, a speaker 163, a vibration motor 164, a connector 165, a keypad 166, or an input unit 167.

The button 161 may include a menu button 161a, a home button 161b, and a back button 161c positioned at the lower part of the front side 100a. The button 161 may include a power/lock button 161d of a side 100b and at least one volume button 161e. Further, the button 161 may include just the home button 161a. The button 161 may be implemented not with a physical button, but with a touch button. Further, the button 161 may be displayed on the touch screen 190.

The microphone 162 may receive a voice or sound from the outside and generate an electric signal under the control of the controller 110. The electric signal generated in the microphone 162 may be converted in the audio codec unit and may be stored in the storage unit 175 or be output through the speaker 163. One or a plurality of microphones 162 may be disposed at the front side 100a, the lateral side 100b, and the rear side 100c of the portable device 100. Further, at least one microphone may be disposed at the lateral side 100b.

The speaker 163 may output sounds corresponding to various signals (e.g., a wireless signal, a broadcast signal, an audio source, a video file, or photographing, and the like) of the mobile communication unit 120, the sub-communication unit 130, the multimedia unit 140, or the camera unit 150 under the control of the controller 110.

The speaker 163 may output sounds (e.g., a touch operation sound corresponding to a phone call, a photographing button operation sound, and the like) corresponding to the function performed by the portable device 100. At least one speaker 163 may be disposed at the front side 100a, the lateral side 100b, and the rear side 100c of the portable device 100. As illustrated in FIGS. 2 and 3, a plurality of speakers 163a and 163b are disposed at the front side 100a and the rear side 100c. Further, the plurality of speakers 163a and 163b may be disposed on the front side 100a, or one speaker 163a may be disposed on the front side 100a and a plurality of speakers (not shown) may be disposed on the rear side 100c.

Furthermore, at least one speaker (not shown) may be disposed on the lateral side 100b. The portable device 100, where at least one speaker (not shown) is disposed at the lateral sides 100a and 100b, may provide sound effects which are different from when the speaker is disposed at the front side 100a and the rear side 100c.

The speaker 163 may output the auditory feedback corresponding to the touch of the camera widget buttons 503b, 504b, and 505b illustrated in FIG. 5A, and the photographing buttons 503h illustrated in FIGS. 5B and 512c illustrated in FIG. 7B, and the environment setting 904 illustrated in FIGS. 9C and 906 illustrated in FIG. 9D of the camera widget under the control of the controller 110.

The vibration motor 164 may convert electric signals to mechanical vibrations under the control of the controller 110. For example, the vibration motor 164 may include a linear vibration motor, a bar-type vibration motor, a coin-type vibration motor, a piezoelectric vibration motor, and the like. When a voice call request is received from another portable device (not shown), the vibration motor 164 operates in the portable device 100 of a vibration mode. One or a plurality of vibration motors 164 may be disposed at the portable device 100. Further, the vibration motor 164 may enable the whole of the portable device 100 to be vibrated or a part of the portable device 100 to be vibrated.

The vibration motor 164 may output a tactile feedback corresponding to the touch of the camera widget buttons 503b, 504b, and 505b illustrated in FIG. 5A, and the photographing buttons 503h illustrated in FIGS. 5B and 512h illustrated in FIG. 7B, and the environment settings 904 illustrated in FIGS. 9C and 906 illustrated in FIG. 9D of the camera widget under the control of the controller 110. The vibration motor 164 may provide various tactile feedbacks (e.g., the intensity of the vibration, duration of the vibration, and the like) based on the control command by the controller 110.

The connector 165 may be used as an interface for connecting an external device (not shown) or a power source (not shown) with the portable device 100. The data stored in the storage unit 175 of the portable device 100 may be transmitted to an external device (not shown) or data may be received from the external device (not shown) through a wired cable connected to the connector 165. The power may be input from the power source (not shown) or the battery (not shown) may be charged through the wired cable connected to the connector 165.

The keypad 166 may receive a key input from the user for control of the portable device 100. The keypad 166 includes a physical keypad (not shown) formed in the portable device 100 or a virtual keypad (not shown) displayed on the touch screen 190. The physical keypad (not shown) formed in the portable device 100 may be excluded according to the performance or structure of the portable device 100.

The input unit 167 may touch or select the object (e.g., a menu, a text, an image, a figure, an icon, and the like) displayed on the touch screen 190 of the portable device 100. The input unit 167 may input characters, and the like, by touching a touch screen of a capacitance type, a resistive type, or an electromagnetic induction type, or by using a virtual keyboard. For example, the input unit 167 includes a stylus pen or a haptic pen where a vibration device (e.g., a vibration motor, an actuator, and the like) vibrates by using control information received from the communication unit of the portable device 100. Further, the vibration device may be vibrated by using information detected in the sensor (e.g., an acceleration sensor (not shown), and the like) which is mounted in the haptic pen, not by using control information received from the portable device 100.

The sensor unit 170 includes at least one sensor which detects the state of the portable device 100. For example, the sensor unit 170 may be disposed at the upper part of the front side 100a of the portable device 100, and may include the proximity sensor 171 which detects the approach to the portable device 100, the illumination sensor 172 which detects the amount of light around the portable device 100, the gyro sensor 173 which detects the direction by using the rotation inertia of the portable device 100, an acceleration sensor (not shown) which detects the tilt of three axes (e.g., the x-axis, y-axis, and z-axis) applied to the portable device 100, a gravity sensor which detects the direction of the application of the gravity force, an altimeter which detects the altitude by measuring the pressure in the air, and the like.

The sensor unit 170 may measure the acceleration which is the sum of the kinetic acceleration of the portable device and the gravity acceleration, and when the portable device 100 does not move, may measure the gravity acceleration. For example, when the front side of the portable device 100 is faced upwards, the gravity acceleration may be a positive (+) direction, and when the rear side of the portable device 100 is faced upwards, the gravity acceleration may be a negative (−) direction.

At least one sensor included in the sensor unit 170 detects the state of the portable device 100, generates a signal corresponding to the detection, and transmits the signal to the controller 110. The sensors of the sensor unit 170 may be added or deleted according to the performance of the portable device 100.

The storage unit 175 may store input/output signals or data corresponding to the operation of the mobile communication unit 120, the sub-communication unit 130, the multimedia unit 140, the camera unit 150, the GPS unit 155, the input/output unit 160, the sensor unit 170, and the touch screen 190. The storage unit 175 may store a control program for control of the portable device 100 or the controller 110, a GUI related to an application provided from a manufacturing company or downloaded from an external source, images for providing the GUI, user information, documents, database, related data, and the like.

The storage unit 175 may store touch information (e.g., x and y coordinates of the touch, touch time, and the like) corresponding to each touch, or first hovering information (e.g., x, y and z coordinates of the hovering, hovering time, and the like) corresponding to the first hovering. The storage unit 175 may store an auditory feedback which is outputted from the speaker 163 which may be recognized by the user and a tactile feedback which is outputted from the vibration motor 164 in response to each touch.

In various embodiments of the present disclosure, the term "storage unit" includes the storage unit 175, the ROM 112, the RAM 113, or a memory card (not shown) mounted on the portable device 100, such as a micro Secure Digital (SD) card, a memory stick, and the like. The storage unit may include a non-volatile memory, a volatile memory, a Hard Disk Drive (HDD), a Solid State Driver (SSD), and the like.

The power supply unit 180 may supply power to one or a plurality of batteries (not shown) which are disposed at the portable device 100 under the control of the controller 110. One or a plurality of batteries (not shown) are disposed between a touch screen 190 positioned on the front side 100a, and the rear side 100c. Further, the power supply unit 180 may supply power, which is inputted from an external power source (not shown), to the portable device 100 through a wired cable (not shown) connected to the connector 165.

The touch screen 190 may provide a GUI corresponding to various services, such as a call, a data transmission, a broadcast, photographing, a video, an application, and the like, to a user. The touch screen 190 transmits analog signals corresponding to one or a plurality of touches, which are inputted through the GUI, to a touch screen controller 195. The touch screen 190 may receive one or a plurality of touches by the user, for example, using a finger, such as a thumb, a touch input unit 167, and the like.

In various embodiments of the present disclosure, a touch is not limited to a contact of the touch screen 190 with the user's body or the touch input unit 167, but may include a non-contact, such as a hovering of a detectable gap of 30 mm or less between the touch screen 190 and the user's body or the input unit 167. In the touch screen 190, the detectable non-contact gap may be changed according to the performance or structure of the portable device 100.

The touch screen 190 may be implemented with a resistive type, a capacitive type, an infrared type, or an acoustic wave type.

The touch screen controller 195 may convert an analog signal, corresponding to one or more touches received from the touch screen 190, into a digital signal, such as x and y coordinates, corresponding to a touched location, and transmit the digital signal to the controller 110. The controller 110 may calculate x and y coordinates corresponding to a touched location on the touch screen by using the digital signal received from the touch screen controller 195. Further, the controller 110 may control the touch screen 190 by using the digital signal received from the touch screen controller 195. For example, the controller 110 may display that a shortcut icon (not shown) displayed on the touch screen 190 has been selected in response to the inputted touch or may execute and display an application corresponding to the selected shortcut icon (not shown).

According to an embodiment of the present disclosure, one touch screen controller 195 may control the touch screen 190. The touch screen controller 195 may be included in the controller 110 in response to the performance or structure of the portable device 100.

At least one of components illustrated in the portable device 100 of FIG. 1 may be added or deleted in response to the performance of the portable device 100. Further, it may be easily understood by those ordinarily skilled in the art that the location of the components may be changed according to the performance or structure of the portable device 100.

FIG. 2 is a front view schematically illustrating a portable device according to an embodiment of the present disclosure.

FIG. 3 is a rear view schematically illustrating a portable device according to an embodiment of the present disclosure.

Referring to FIGS. 2 and 3, the touch screen 190 is disposed at the central part of the front side 100a of the portable device 100. FIG. 2 shows an example where a home screen is displayed on the touch screen when the user logs in the portable device 100. The portable device 100 may have a plurality of different home screens. A home screen 191 may display shortcut icons 191a, 191b, and 191c for executing frequently used applications, a menu conversion key 191d for displaying the menu screen, time, the weather, and the like. A status bar 192 for indicating the status of the device 100, such as the battery-charged status, the intensity of the received signal, the current time, and the like, may be displayed on the upper part of the home screen 191. The status bar 192 of the home screen 191 of the portable device 100 may not be displayed according to the Operating System (OS).

The home button 161a, the menu button 161b, and the back button 161c are positioned on the lower part of the front side 100a of the portable device 100. The button may be implemented, not with a physical button, but with a touch button. Further, the button 161 may be displayed on the touch screen 190.

The first camera 151, the proximity sensor 171, and the illumination sensor 172 may be disposed at the upper part of the front side 100a of the portable device 100. The second camera 152, the flash 153, and the speaker 163 may be disposed on the rear side 100c of the portable terminal 100.

A power/lock button 161d, a volume button 161e, one or more microphones 162, and the like, may be disposed at the lateral side 100b of the portable device 100. The connector 165 is formed at the lower lateral side of the portable device 100 and may be connected to an external device by a wire. The input unit 167 including a button 167a may be located at the lower part of the portable device 100. The input unit 167 may be inserted into the portable device 100, and may be outputted from the portable device when used.

Figure 4:
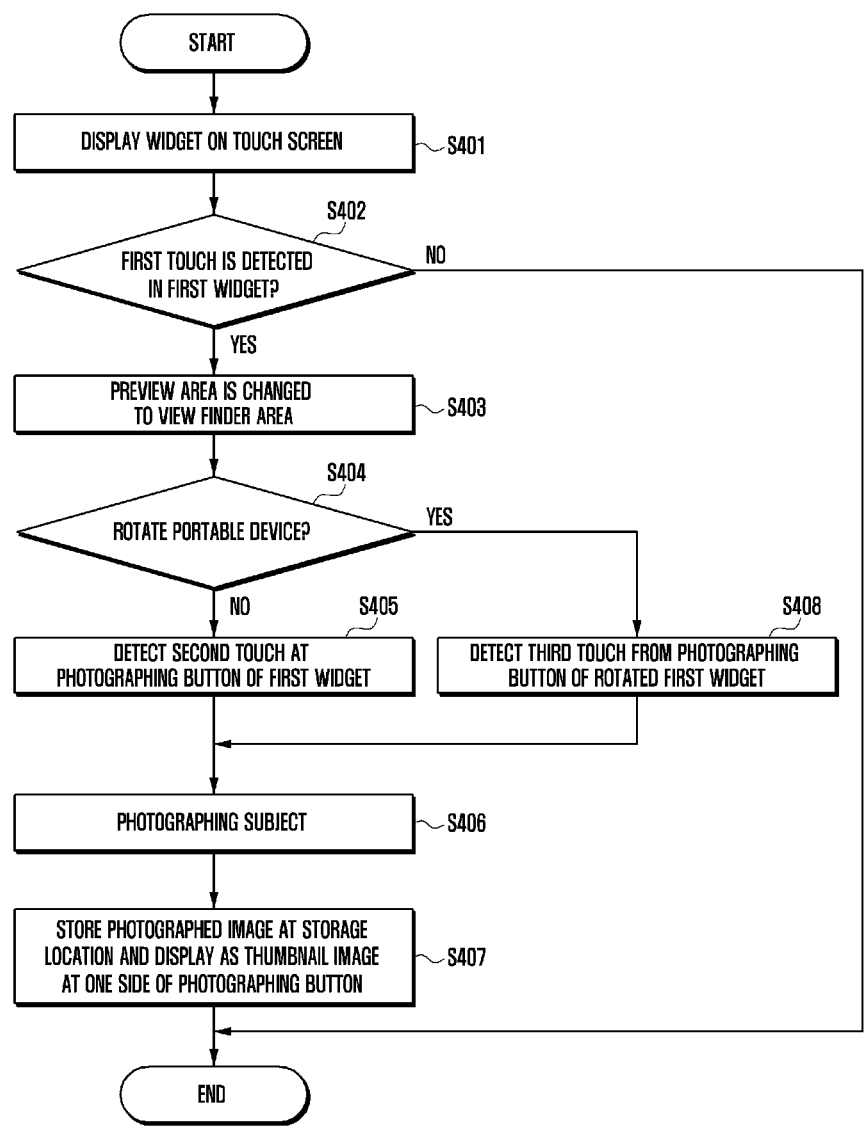
FIG. 4 is a flowchart schematically illustrating a method for taking a photograph of a portable device according to an embodiment of the present disclosure.

FIG. 4 is a flowchart schematically illustrating a method for taking a photograph of a portable device according to an embodiment of the present disclosure.

FIGS. 5A, 5B, 5C, 5D, 5E, and 5F illustrate photographs taken by a portable device according to an embodiment of the present disclosure.

At operation S401 of FIG. 4, a widget is displayed on a touch screen.

Referring to FIGS. 5A, 5B, 5C, 5D, 5E, and 5F, a screen 500 is displayed on a touch screen 190. The screen 500 includes a status bar 501 and a display area 502. The status bar 501 displays the status of the portable device 100, such as the charged state 501a of the battery, the intensity 501b of the received signal of the mobile phone, a vibration mode icon (not shown), and the like. The display area 502 may display at least one widget (191 of FIG. 2) executable in the portable device 100 and/or a shortcut icon (191a to 191d of FIG. 2) corresponding to the application.

The status bar 501 may not be displayed on the screen 500 according to the OS or application of the portable device 100. When the status bar 501 is not displayed, the screen 500 may be displayed on the touch screen 190.

Various camera widgets may be displayed on the touch screen 190 according to an embodiment of the present disclosure. The camera widget may have a plurality of types, and the camera widget corresponding to the user selection may be displayed on the touch screen 190. For example, FIGS. 5A, 5B, 5C, 5D, 5E, and 5F show three types of camera widgets 503, 504, and 505 to which the same storage location has been set.

The first camera widget 503 includes a storage location name 503a, a camera widget button 503b, an environment setting movement area 503c, and a preview area 503d. The first camera widget 503 may include the storage location name 503a corresponding to the storage location (e.g., a folder whose name is Hawaii Travel) within the storage unit where a photographed image is stored, the camera widget button 503b which photographs a subject shown in a view finder area 506 by a touch (i.e., a first touch 506a) or changes the preview area 503d to the view finder area 506 by a touch, the environment setting movement area 503c which is an area within the first camera widget 503 and not the camera widget button 503b and the preview area 503d and can be moved to the environment setting movement area 503c by a touch, and the preview area 503d which displays the storage location where an image 503e (e.g., a still image, a first frame of a video, and the like) of a file is previously stored by a touch, or which is changed to a view finder by a second touch. The part of the camera widget button 503 may be overlapped with the preview area 503d.

The second camera widget 504 includes a storage location name 504a, a camera widget button 504b, and a storage location movement area 504c. The second camera widget 504 may include the storage location name 504a corresponding to the storage location (e.g., a folder whose folder name is Hawaii Travel) within the storage unit where a photographed image is stored, the camera widget button 504b for executing a camera application by a touch, and the storage location movement area 504c which is the area within the second camera widget 504 and not the camera widget button 504b and can be moved to a storage location by a touch. When the storage location name 504a is selected by the user's touch or input unit 167, the controller 110 may move the screen to the first camera widget environment setting.

The third camera widget 505 includes a storage location name 505a and a camera widget button 505b. The third camera widget 505 may include the storage location name 505a corresponding to the storage location, for example, a folder whose folder name is Hawaii Travel, within the storage unit where a photographed image is stored, and the camera widget button 505b for executing the camera application by a touch. The third camera widget 505 may include a shortcut icon. When the shortcut icon is selected, movement to the storage location name 505a may occur, or the camera application may be executed.

At operation S402 of FIG. 4, a first touch is detected in the first widget.

Referring to FIG. 5A, the first touch 506a, which is inputted by the user in the camera widget button 503b of the first camera widget 503, is detected. The controller 110 detects the first touch 506a in the camera widget button 503b of the first camera widget 503 through the touch screen 190 and the touch screen controller 195. The controller 110 receives the first location information (e.g., x1 and y1 coordinates corresponding to the first touch 506a) corresponding to the first touch 506a from the touch screen controller 195.

Further, the hovering of the input unit 167 is detected in the camera widget button 503b of the first widget 503. The controller 110 detects the hovering of the input unit 167 in the camera widget button 503b of the first camera widget 503 through the pen recognition panel (not shown) and the touch screen controller 195. The controller 110 receives the second location information (e.g., x2 and y2 coordinates) corresponding to hovering (not shown) which is detected from the touch screen controller 195.

The controller 110 may store a touch on the touch screen 190 included in the received first location information, a hovering location on the touch screen 190 included in the second location information, the touch detection time (e.g., 14:21), and the touch information (e.g., touch pressure, hovering height, and the like) corresponding to the touch in the storage unit 175. The touch contacted to the camera widget button 503b of the first camera widget 503 may be generated by one of a finger, such as a thumb, or an input unit for touch 167.

It may be easily understood by those ordinarily skilled in the art that the number of detected touches may be changed according to the performance or structure of the portable device 100.

When it is determined in operation S402 of FIG. 4 that the first touch is not detected in the first camera widget 503, the widget is terminated.

On the other hand, if it is determined in operation S402 that the first touch is detected in the first camera widget 503, the preview area 503d of the first camera widget 503 is changed to the view finder area at operation S403 of FIG. 4.

Referring to FIG. 5B, the controller 110 changes the preview area 503d to the view finder area 503f in response to the first touch 506a. The view finder area 503f displays a subject 503g, for example, scenery, which is inputted through the second camera 152 of the portable device 100. The area of the view finder area 503f may be wider than or the same as the area of the preview area 503d.

The camera widget button 503b of the first camera widget 503 may be changed to the photographing button 503h on the lower part of the view finder area 503f according to the change to the view finder area 503f. The changed photographing button 503h is not overlapped with the view finder area 503f. The image 503e of the file, which is previously stored in the storage location, is reduced to a thumbnail image 503i and is displayed at one side of the photographing button 503h.

At operation S404 of FIG. 4, the rotation of the portable device is determined.

The controller 110 may detect the rotation of the portable device 100 by using the sensor unit 170. The detected angle ranges from 0° to 360°. The first camera widget 503 may be rotated in response to the rotation, (e.g., in a clockwise direction or a counter-clockwise direction) of the portable device 100. Referring to FIG. 5B, the portable device 100 is in a non-rotated state, for example, 0°.

When it is determined in operation S404 of FIG. 4 that the portable device 100 is rotated, the operation proceeds to operation S408 of FIG. 4. At operation S408 of FIG. 4, a third touch is detected in the photographing button of the rotated first widget.

On the other hand, if it is determined in operation S402 that the portable device 100 is not rotated, the second touch is detected in the photographing button of the first widget at operation S405 of FIG. 4.

Referring to FIG. 5B, a second touch 507a in a touch area 507, which is inputted by the user, is detected in the photographing button 503h of the first camera widget 503. The controller 110 detects the second touch 507a in the photographing button 503h through the touch screen 190 and the touch screen controller 195. The controller 110 receives the third location information (e.g., x3 and y3 coordinates corresponding to the second touch 507a) corresponding to the second touch 507a from the touch screen controller 195.

Further, the hovering of the input unit 167 is detected in the camera widget button 503b of the first camera widget 503. The controller 110 detects the hovering of the input unit 167 in the photographing button 503h of the first camera widget 503 through a pen recognition panel (not shown) and the touch screen controller 195. The controller 110 receives x4 and y4 coordinates corresponding to the fourth location information (e.g., hovering (not shown)) corresponding to the hovering (not shown) which is detected from the touch screen controller 195.

The controller 110 may store the touch on the touch screen 190 included in the received third location information, the hovering location on the touch screen 190 included in the fourth location information, the touch detection time (e.g., 14:22), the touch information (e.g., a touch pressure, a hovering height, and the like) corresponding to the touch, and the like, in the storage unit. The touch contacted to the photographing button 503h of the first camera widget 503 may be generated by one of a finger, such as a thumb, or an input unit for touch 167.

It may be easily understood by those ordinarily skilled in the art that the number of detected touches may be changed according to the performance or structure of the portable device 100.

At operation S406 of FIG. 4, a subject is photographed.

Figure 5C:
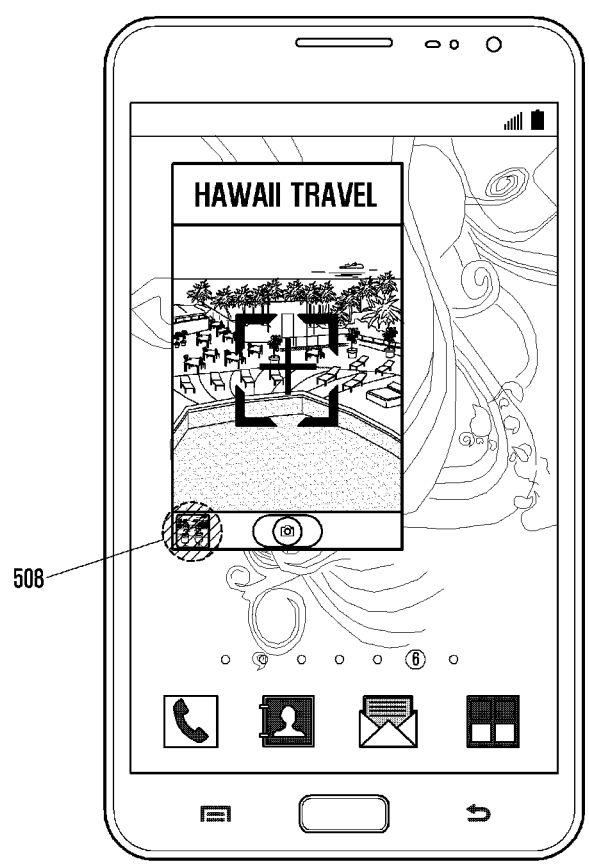

Referring to FIG. 5C, the controller 110 photographs the subject 503g shown on the view finder area 503f by using the second camera 152 in response to a second touch 507a. The controller 110 may photograph the subject 503g by applying an environment setting to the first camera widget 503. The environment setting of the first camera widget 503 may be divided into an environment setting applied before photographing the subject and an environment setting applied after photographing the subject. The environment setting applied before photographing the subject may include a selection of a front side camera/rear side camera, a landscape viewing/portrait viewing, a photo/video photographing, a timer, a white balance, an exposure value, a photo effect, such as black and white, sepia, inversion, continuous photographing, and the like. The environment setting applied after photographing may include an image effect, a tag addition/text addition by using various filters, and the like. When the environment setting before photographing of the first camera widget 503 is set in such a manner that the flash is off and the effect is sepia, the controller 110 may photograph a subject by applying the setting applied before photographing. It would be easily understood by those ordinarily skilled in the art that the change, addition, or deletion of the environment setting before/after photographing may be changed according to the performance and structure of the camera widget and/or camera application of the camera unit 150 of the portable device 100.

At operation S407 of FIG. 4, the photographed image is stored in the storage location and is displayed as a thumbnail image at one side of the photographing button.

Figure 5D:
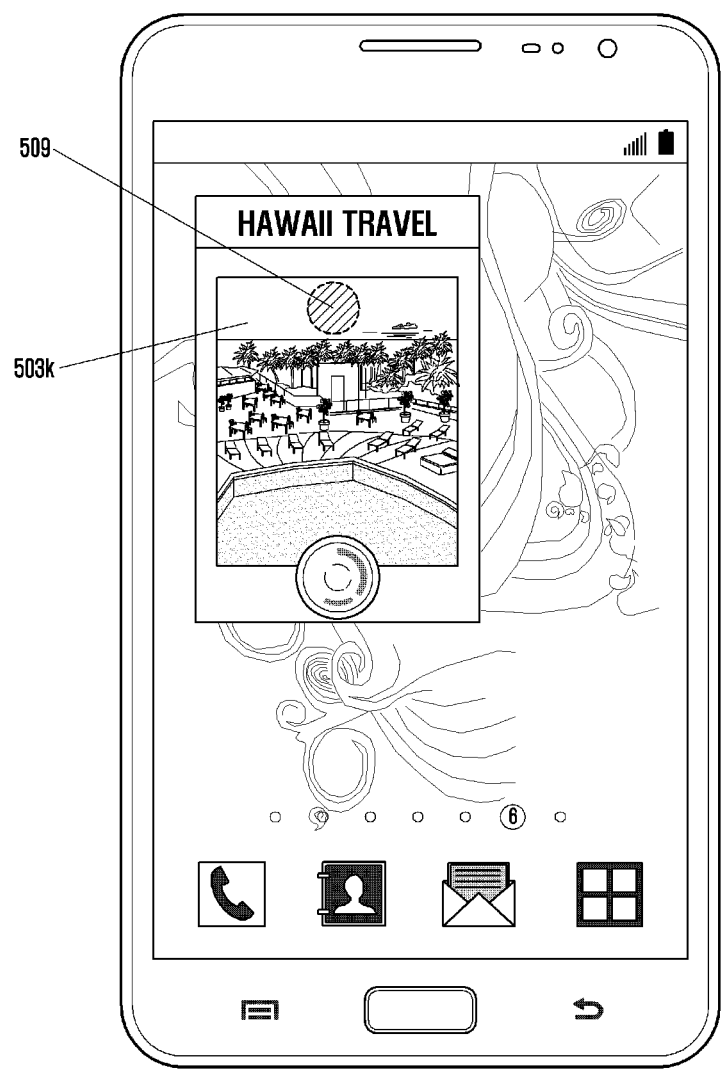
Figure 5E:
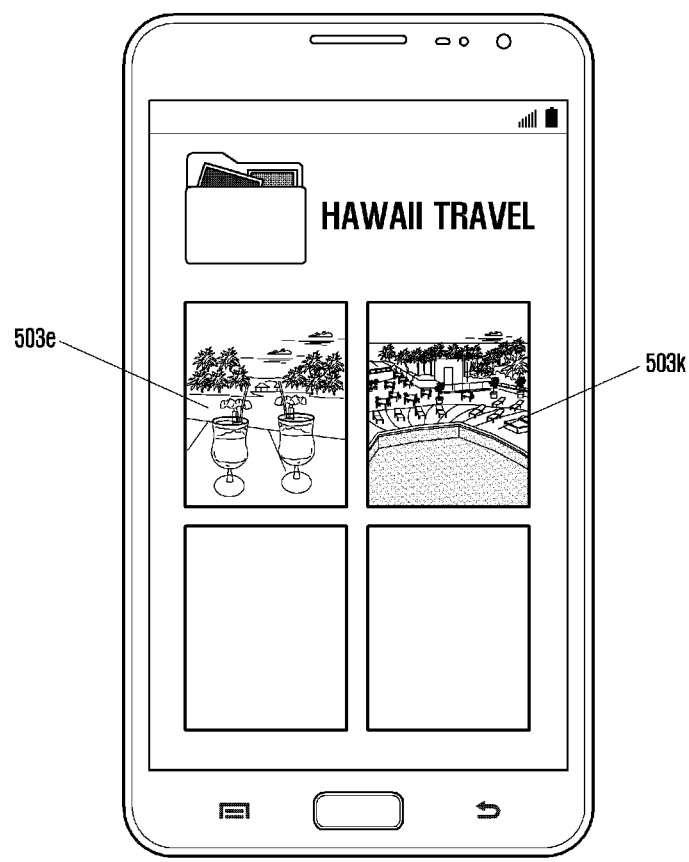

Referring to FIGS. 5C, 5D, and 5E, the controller 110 may store a photographed image 503k in a set storage location of the first camera widget 503, for example, a folder whose name is Hawaii Travel, and may display the photographed image 503k as a thumbnail image 503i at one side of the photographing button 503h. Referring to FIG. 5C, the controller 110 may detect a third touch 508 on the thumbnail image 503i. Since the detection of the third touch 508 is identical with the detection of the first touch 506a and the second touch 507a, the description is omitted. The controller 110 controls to change the view finder area 503f into the preview area 503d of the first camera widget 503 and to display the photographed image 503k in the preview area 503d, in response to the third touch 508. The controller 110 changes the photographing button 503h to the camera widget button 503b. The controller 110 may display the photographed image 503k through the environment setting on the gallery application (not shown) as well as the preview area 503d of the first camera widget 503.

Referring to FIG. 5D, the controller 110 may detect the fourth touch 509 in the preview area 503d. Since the detection of the fourth touch 509 is identical with the first touch 506a, the second touch 507a, and the third touch 508, the description is omitted. The controller 110 moves to the folder whose name is Hawaii Travel within the storage unit in response to the fourth touch 509. Two image files 503e and 503k are displayed on the Hawaii Travel folder.

At operation S407 of FIG. 4, when storing the photographed image in the storage location and displaying the image at one side of the photographing button as a thumbnail image, the controller 110 terminates the photographing by using the widget of the portable device 100.

Figure 5F:
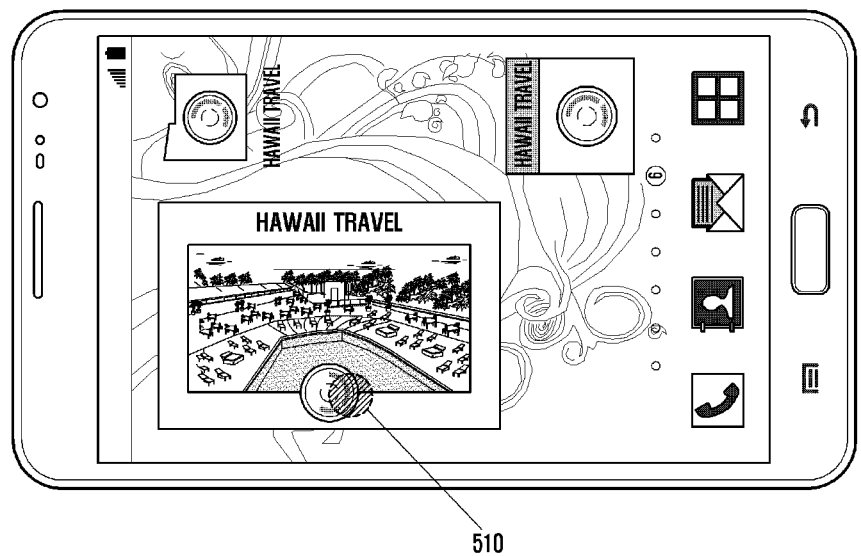

Referring to FIG. 5F, the controller 110 rotates the first camera widget 503 in a counter-clockwise direction in response to the rotation in the counter-clockwise direction of the portable device 100. The mode of the first camera widget 503 is changed from the portrait mode which was the mode before the rotation of the portable device 100 to the landscape mode.

The controller 110 does not change the mode of the camera widgets 504 and 505 but changes the mode of the first camera widget 503, and other shortcut icons, into the landscape mode in response to the rotation of the portable device 100. Further, the controller 110 may change the mode of the first camera widget 503 to the portrait mode by rotating in a clockwise direction in response to the rotation in the clockwise direction of the portable device 100. Further, the controller 110 may rotate all camera widgets 503 to 505 and the remaining shortcut icons in a counter-clockwise direction in response to the counter-clockwise rotation of the portable device 100.

A fifth touch 510 inputted by the user is detected on the photographing button 503h of the first camera widget 503. The controller 110 detects the fifth touch 510 on the photographing button 503h through the touch screen 190 and the touch screen controller 195. Since the detection of the fifth touch 510 is identical with the detection of the first touch 506a and the second touch 507a, the detailed description is omitted.

Figure 6:
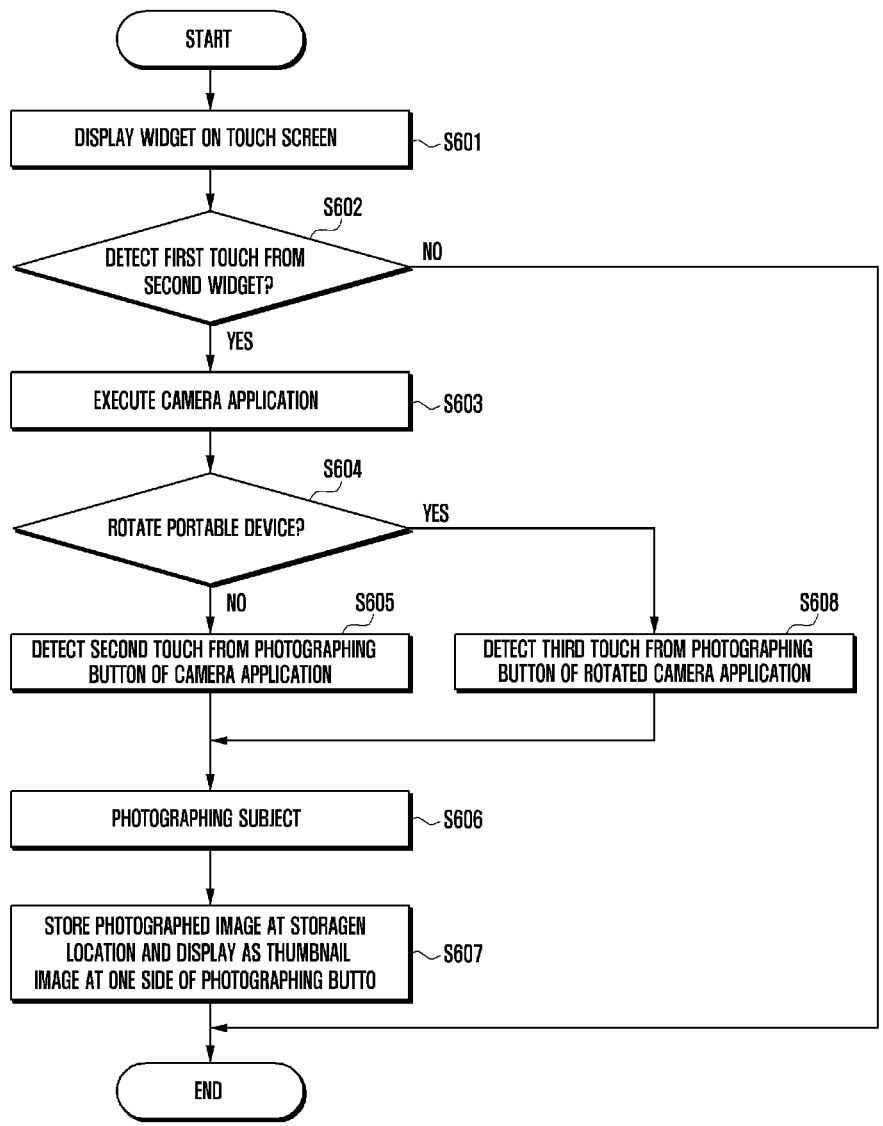
FIG. 6 is a flowchart schematically illustrating a method for taking a photograph by a portable device according to an embodiment of the present disclosure.

FIG. 6 is a flowchart schematically illustrating a method for taking a photograph of a portable device according to an embodiment of the present disclosure.

FIGS. 7A and 7B illustrate methods of taking a photograph of a portable device according to an embodiment of the present disclosure.

At operation S601 of FIG. 6, a widget is displayed on the touch screen.

Referring to FIG. 7A, three types of camera widgets 503, 504, and 505 having the same storage location are displayed. The second camera widget 504 includes a storage location name 504a, a camera widget button 504b, and a storage location movement area 504c. The second camera widget 504 may include the storage location name 504a corresponding to the storage location (e.g., a folder whose name is Hawaii Travel) within the storage unit where a photographed image is stored, the camera widget button 504b for executing the camera application by a touch, and the storage location movement area 504c which is an area within the second camera widget 504 and not the camera widget button 504b and can be moved to a storage location by a touch.

The third camera widget 505 includes the storage location name 505a and the camera widget button 505b. The third camera widget 505 may include the storage location name 505a corresponding to a storage location (e.g., a folder whose folder name is Hawaii Travel) where a photographed image is stored, and the camera widget button 505b for executing a camera application by a touch.

Since the operation S601 of FIG. 6 is identical with the operation S401 of FIG. 4, the detailed description is omitted.

At operation S602 of FIG. 6, a first touch is detected in the second widget.

Referring to FIG. 7A, a first touch 511a, which is inputted by the user on the camera widget button 504b of the second camera widget 504, is detected. The controller 110 detects the first touch 511a on the camera widget button 504b of the second camera widget 504 through the touch screen 190 and the touch screen controller 195. The camera widget button 504b photographs a subject shown in a view finder area 511 by a touch (i.e., the first touch 511a). The controller 110 receives first location information (e.g., X11 and Y11 coordinates corresponding to the first touch 511a) corresponding to the first touch 511a from the touch screen controller 195.

Referring to FIG. 7A, the first touch (not shown), which is inputted by the user on the camera widget button 505b of the third camera widget 505, may be detected. The controller 110 detects the first touch (not shown) on the camera widget button 504b of the third camera widget 505 through the touch screen 190 and the touch screen controller 195. The controller 110 receives x21 and y21 coordinates corresponding to the first location information (e.g., the first touch (not shown)) corresponding to the first touch (not shown) from the touch screen controller 195.

Since the operation S602 of FIG. 6 is identical with the operation S402 of FIG. 4, detailed description is omitted.

At operation S603 of FIG. 6, the camera application is executed.

Referring to FIG. 7B, the controller 110 executes and displays the camera application 512 in response to the first touch 511 of the second camera widget 504. The controller 110 may execute and display the camera application 512 in response to the first touch (not shown) of the third camera widget 505.

The camera application 512 may include a storage location name 512a corresponding to the storage location (e.g., a folder whose folder name is Hawaii Travel) within the storage unit where a photographed image is stored, a view finder 512b where a subject is viewed, a touch 513 of a photographing button 512c, a thumbnail image 512d where a photographed image is reduced and displayed, and an environment setting icon 512e which can move to an environment setting screen of the camera application and/or the camera widget.

In the camera application 512 executed through the second camera widget 504 or the third camera widget 505, since the storage location name 512a is displayed on the upper end of the view finder 512b, it may be distinguished from other camera applications (not shown). The fact that the location of the storage location name 512a displayed on the upper end of the view finder 512b may be changed may be easily understood by those ordinarily skilled in the art.

It may be easily understood by those ordinarily skilled in the art that many kinds of camera applications are produced and sold and the components 512a to 512e of the camera application 512 may be changed according to the performance and structure of the camera application.

Since the operations S604 to S608 of FIG. 6 are identical with the operations S404 to S408 of FIG. 4 in the components other than the type of the camera widget and the camera application, the detailed description is omitted.

Figure 8:
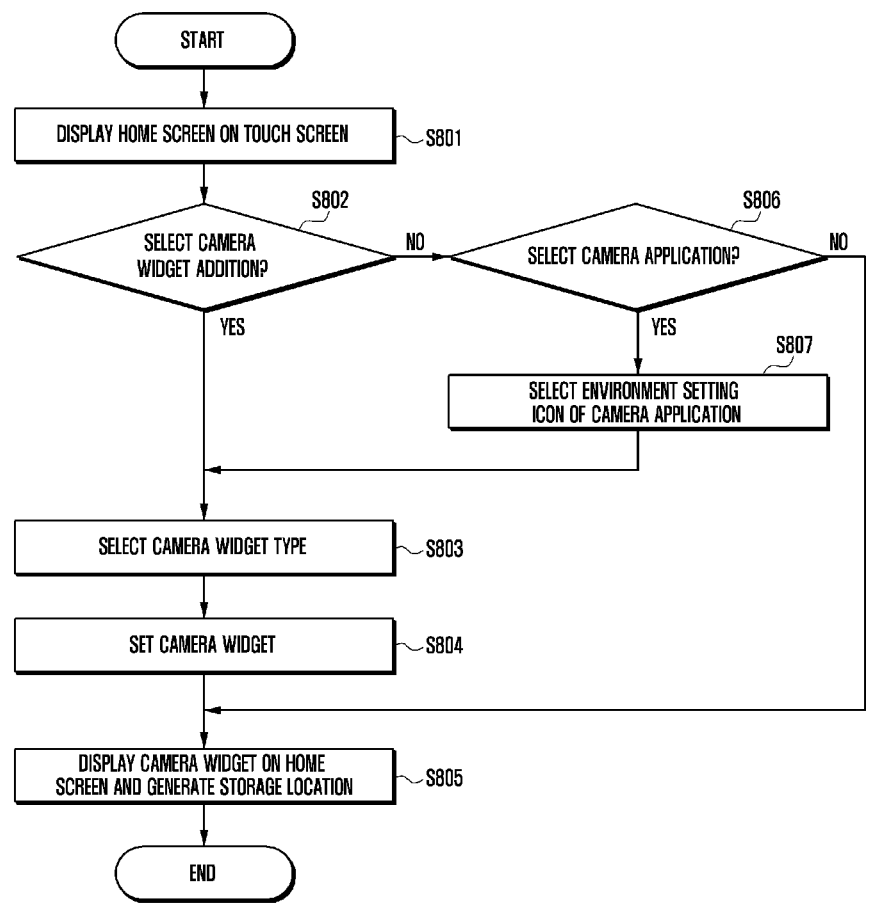
FIG. 8 is a flowchart schematically illustrating a photographing setting of a portable device according to an embodiment of the present disclosure.

FIG. 8 is a flowchart schematically illustrating a photographing setting of a portable device according to an embodiment of the present disclosure.

FIGS. 9A, 9B, 9C, 9D, 9E, and 9F illustrate a photographing setting of a portable device according to an embodiment of the present disclosure.

At operation S801 of FIG. 8, a home screen is displayed on the touch screen.

Referring to FIG. 9A, the controller 110 displays the home screen on the touch screen by the user's selection of the home button 161b or the back button 161c. The user's button selection may be inputted by the user's touch 901 or input unit 167.

At operation S802 of FIG. 8, the selection of the camera widget addition is detected.

Referring to FIGS. 9A and 9B, the touch screen 190 is pressed for a long period of time by the user's touch (900) or input unit 167. The controller 110 may display a camera widget addition 902 in FIG. 9B in response to the press for a long period of time of the touch screen 190. The camera widget addition 902 is selected by the user's touch or input unit 167. The controller 110 detects the first touch 903 corresponding to a selection of the camera widget addition 902 through the touch screen 190 and the touch screen controller 195. The controller 110 receives first location information (e.g., x31 and y41 coordinates corresponding to the first touch 903a) corresponding to the first touch 903 from the touch screen controller 195.

At operation S802 of FIG. 8, when it is determined that the selection of the camera widget addition is not detected, the operation proceeds to operation S806.

At operation S803 of FIG. 8, the camera widget type is selected.

Referring to FIG. 9C, the controller 110 displays the camera widget type 904 in response to the first touch 903. The displayed camera widget type includes a camera icon+folder+preview widget 904a, a camera icon+folder widget 904b, and a camera icon widget 904c. The camera widget 904a corresponding to the camera icon+folder+preview widget is a first camera widget 503 of FIG. 5A, the camera widget corresponding to the camera icon+folder widget 904b is a second camera widget 504 of FIG. 5A, and the camera widget corresponding to the camera icon 904c is a third camera widget 505 of FIG. 5A.

It may be easily understood by those ordinarily skilled in the art that the type of the displayed camera widget may be added, deleted, and changed according to the camera application or the performance and structure of the camera unit 150 of the portable device 100.

Referring to FIG. 9C, the camera icon+folder widget 904b is selected by the user's touch (905) or input unit 167.

At operation S804 of FIG. 8, the camera widget is set.

Referring to FIG. 9D, the controller 110 displays the camera widget environment setting 906 in response to the selection of the camera icon+folder widget 904b. The camera widget environment setting 906 includes a name 906a of the storage location where the image is stored and settings 906b, 906c, 906d, and 906e of the camera widget. The name 906a of the storage location may display the path of the storage location. An icon corresponding to the second camera widget 504 is displayed at one side of the name 906a of the storage location.

When a touch is detected on the icon, the controller 110 may display the list of icons of the camera widget which can be changed (e.g., changing a folder icon of desk top, not shown). When one icon is selected from the list of icons (not shown) of the displayed camera widget, the controller 110 may change the icon corresponding to the second camera widget 504 at one side of the name 906a of the storage location. The controller 110 may change the shape of the icon. For example, the folder shape may be selected from one of a circle, a star, a polygon, and the like. Further, the controller 110 may change the icon color of the camera widget. For example, yellow may be changed to blue. It would be easily understood by those ordinarily skilled in the art that the icon, shape, and color may be changed.

The camera widget environment setting 906 may be divided into an environment setting before photographing applied when photographing a subject and an environment setting after photographing applied after photographing a subject. The environment setting applied before photographing may include a front side camera/rear side camera selection, a landscape viewing/portrait viewing, a photo/video photographing, a timer, a white balance, an exposure value, photo effects (e.g., black and white, sepia, conversion, and the like), continuous photographing, and the like. The environment setting applied after photographing may include an image effect by using various filters, a tag addition/text addition, and the like.

When the environment setting applied before photographing of the first camera widget 503 is that the flash 153 is off and the effect is sepia, the controller 110 may photograph a subject to which the flash-off and sepia effect, which are the environment settings before photographing, are applied. Further, in the camera widget environment setting 906, the size of the camera widgets 503 to 505, which are displayed on the home screen according to the type of the camera widget, may be set. The sizes of the camera widgets 503 to 505 may be set according to the resolution or size of the touch screen 190 of the portable device 100. When the completion button 906f is selected (e.g., by a touch input 906g) in the camera widget environment setting 906, the camera widget environment setting 906 is completed.

At operation S805 of FIG. 8, the camera widget is displayed on the home screen, and the storage location is generated.

Figure 9E:
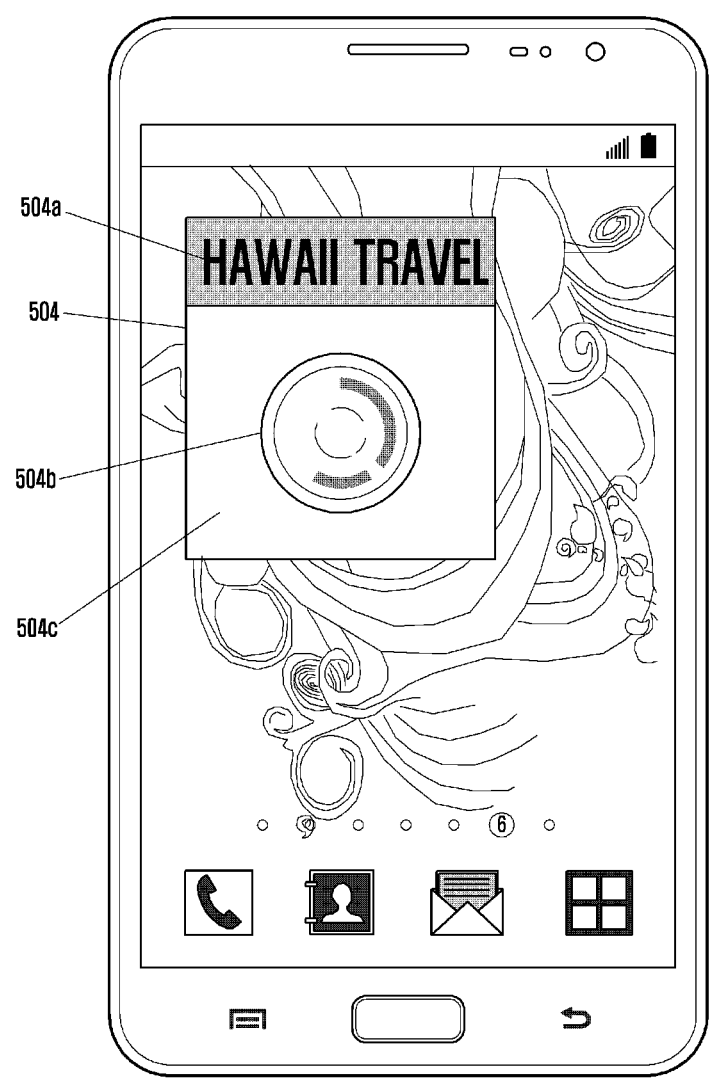
Figure 9F:
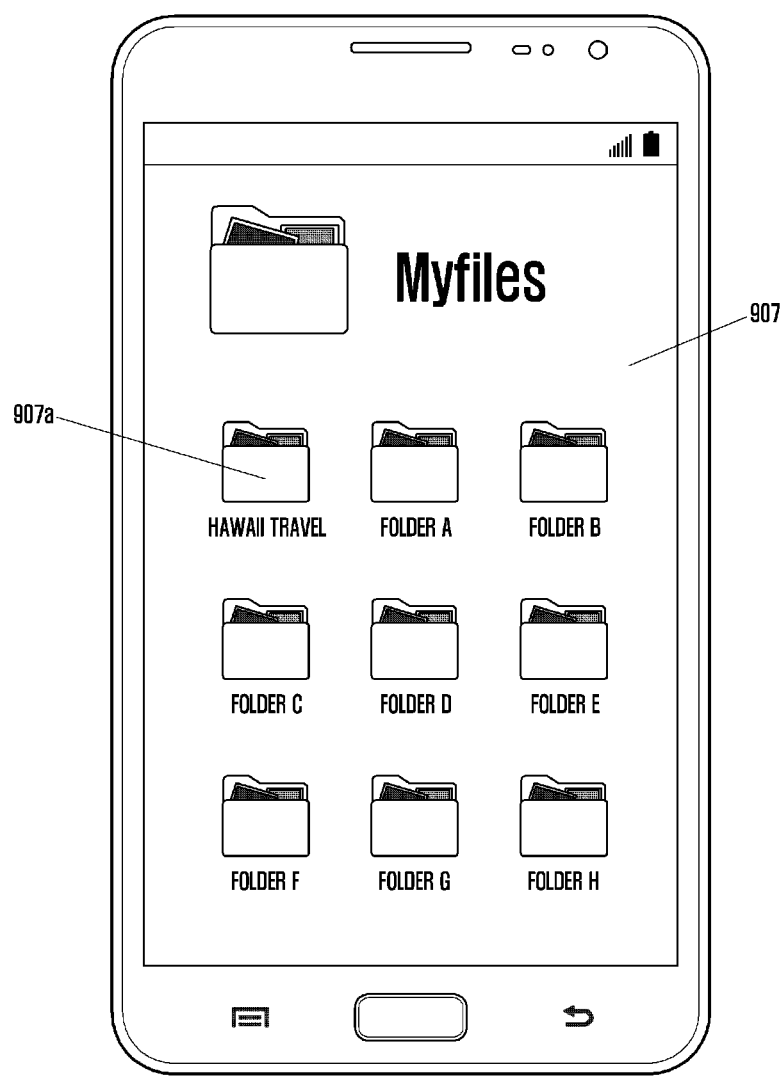

Referring to FIG. 9E, the controller 110 displays the second camera widget 504, which is a camera widget corresponding to the camera icon+folder widget 904b, on the home screen in response to the touch input 906g of the completion button 906f. When the storage location movement area 504c is selected, the controller 110 displays the Hawaii travel folder 906a which is generated through the camera widget environment setting 906 in the folder screen 907 where folders of the storage unit are displayed. When the storage location movement area 504c is selected by the user's touch or input unit 167, the controller 110 may directly move to the generated Hawaii travel folder 907a. For example, the controller 110 may display FIG. 5E.

At operation S805 of FIG. 8, the controller 110 displays the second camera widget 504 on the home screen, and the photographing setting by using the widget of the portable device 100 is terminated.

Returning to operation S802 of FIG. 8, when it is determined that the selection of the camera widget addition is not detected, the operation proceeds to operation S806.

Figure 10A:
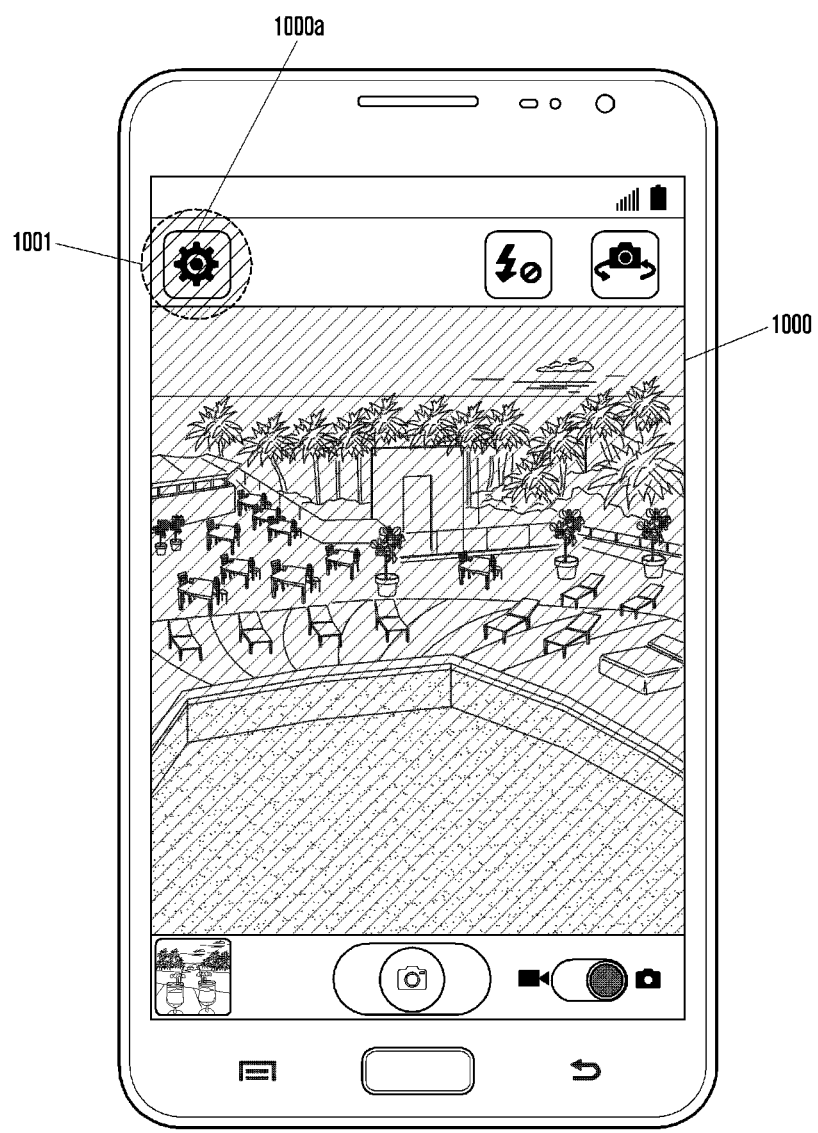
FIGS. 10A and 10B illustrate a photographing setting of a portable device according to an embodiment of the present disclosure.
Figure 10B:
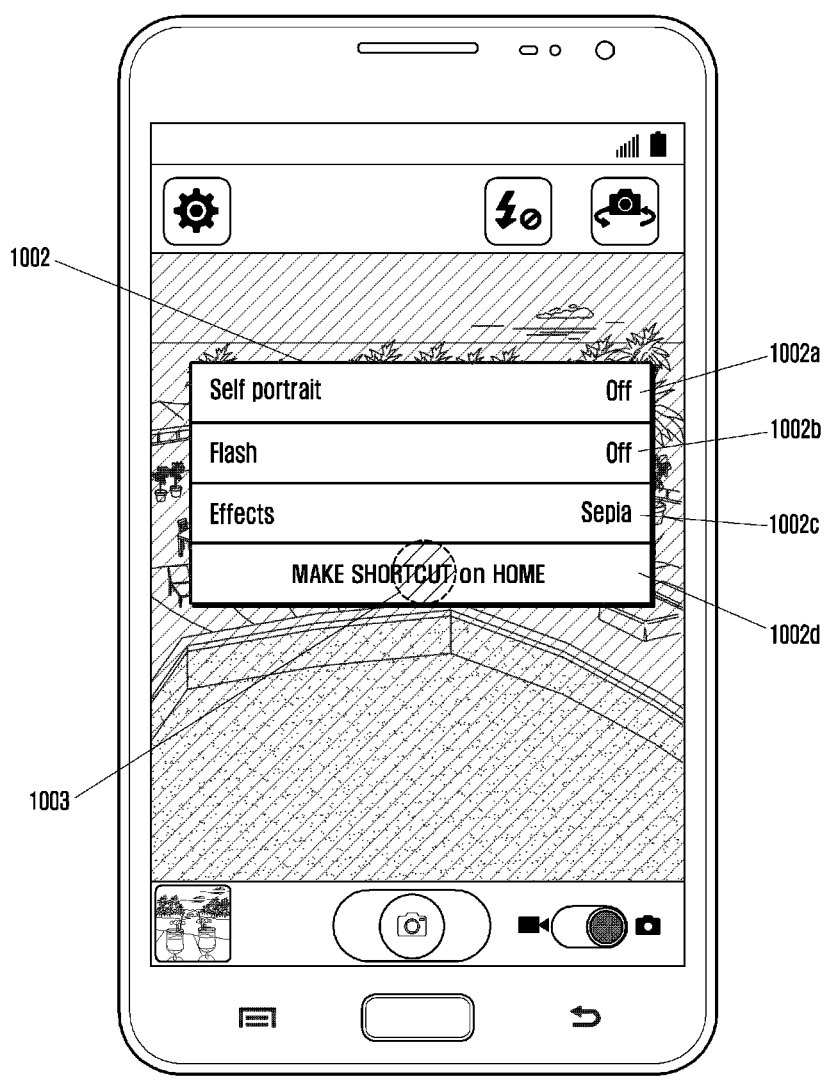

FIGS. 10A and 10B illustrate a photographing setting of a portable device according to an embodiment of the present disclosure.

At operation S806 of FIG. 8, the selection of the camera application is detected.

Referring to FIG. 10A, when the shortcut icon (not shown) corresponding to the camera application 1000 is selected by the user's touch (e.g., by a touch input 1001) or input unit 167, the controller 110 displays the camera application 1000. Since the camera application 1000, which is displayed on FIG. 10A, is identical with the camera application which is displayed on FIG. 7B, the detailed description is omitted.

At operation S807 of FIG. 8, the environment setting icon of the camera application is selected.

Referring to FIG. 10B, the controller 110 displays the environment setting 1002 in response to the selection of the environment setting icon 1000a. The displayed environment setting 1002 includes a shortcut making 1002d on the home screen for the settings 1002a, 1002b, and 1002c of the current camera application 100, and the camera widget addition.

At operation S807 of FIG. 8, if the shortcut making 1002d on the home screen is selected (e.g., by a touch input 1003), the operation proceeds to operation S803.

The methods according to an embodiment of the present disclosure may be implemented in a form of a program command which may be performed through various computer units, and may be recorded in a computer-readable medium. The computer-readable medium may include a program command, a data file, and a data structure solely or as a combination. The program command recorded in the medium is specially designed for the present disclosure, and may be notified and usable to those of ordinary skill in the computer software field.

According to an embodiment of the present disclosure, a method for taking a photograph by using a camera widget where a location, in which the photograph is stored, is set, and a portable device thereof, may be provided.

According to an embodiment of the present disclosure, a method for taking a photograph by using a camera widget stored in a set storage location in which the photographed image is stored by applying an environment setting, and a portable device thereof, may be provided.

According to an embodiment of the present disclosure, a photographing method by using a camera widget having a storage location where the photographed image is stored, a preview area, and a photographing button, and a portable device thereof, may be provided.

According to an embodiment of the present disclosure, a photographing method by using a camera widget having a storage location where the photographed image is stored, and a camera widget button, and a portable device thereof, may be provided.

According to an embodiment of the present disclosure, a photographing method by using a camera widget having a storage location where a photographed image is stored, a preview area, and a photographing button, which may be rotated in response to the rotation of the portable device, and a portable device thereof, may be provided.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, Compact Disc (CD)-ROMs, magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for photographing by using a widget of a portable device, the method comprising:
simultaneously displaying, on a touch screen, a plurality of widgets used for at least one camera function, wherein each of the displayed plurality of widgets includes a storage location name corresponding to a storage location where an image photographed in a camera application is stored, and at least one widget of the plurality of widgets further includes a preview area which displays a photo image stored in the storage location and a photographing button;
in response to detecting a first touch in the at least one widget of the plurality of widgets, changing the preview area of the at least one widget where the first touch is detected to a view finder area;
photographing a subject displayed on the view finder area in response to a second touch detected in the photographing button; and
storing a photographed image corresponding to the subject in the storage location corresponding to the at least one widget where the first touch is detected,
wherein each widget of the plurality of widgets has a different corresponding storage location and corresponding storage location name.

2. The method of claim 1, further comprising:
rotating the at least one widget in response to a rotation of the portable device.

3. The method of claim 2, wherein at least one of the storage location name, the preview area, and the photographing button of the at least one widget are rotated in response to the rotation of the portable device.

4. The method of claim 1, wherein the photographing of the subject comprises photographing the subject by applying an environment setting.

5. The method of claim 1, further comprising:
moving to the storage location in response to a third touch detected in the preview area.

6. The method of claim 1, wherein the photographing button is changed in response to the first touch detected in the at least one widget.

7. The method of claim 1, wherein a size of the photographed image is reduced and displayed at one side of the photographing button.

8. The method of claim 1, wherein the preview area of the at least one widget is located between the storage location name and the photographing button.

9. A non-transitory computer readable medium for storing a computer program of instructions configured to be readable by at least one processor for instructing the at least one processor to execute a computer process for performing the method of claim 1.

10. The method of claim 1, wherein the storage location and the corresponding storage location name are generated according to at least one of a camera widget and an environment setting of the camera widget.

11. The method of claim 1, wherein the storage location comprises a folder and a path to the folder.

12. The method of claim 11, wherein the displaying of the storage location name comprises displaying the path to the corresponding folder.

13. A method for photographing by using a widget of a portable device, the method comprising:
simultaneously displaying, on a touch screen, a plurality of widgets used for at least one camera function, wherein each of the displayed plurality of widgets includes a storage location name corresponding to a storage location where an image photographed in a camera application is stored, and at least one widget of the plurality of widgets further includes a camera widget button;
executing the camera application in response to a first touch detected in the camera widget button of the at least one widget of the plurality of widgets;
photographing a subject by using a photographing button of the executed camera application; and
storing a photographed image corresponding to the subject in the storage location corresponding to the at least one widget where the first touch is detected,
wherein each widget of the plurality of widgets has a different corresponding storage location and corresponding storage location name.

14. The method of claim 13, further comprising:
moving to an environment setting screen which displays an environment setting of the camera application in response to a second touch detected in the at least one widget,
wherein the environment setting may be displayed in a separate screen which is different from a current screen of the at least one widget.

15. The method of claim 14, wherein the environment setting screen is displayed to be adjacent to the at least one widget.

16. The method of claim 14, wherein the photographing of the subject comprises photographing the subject by applying an environment setting.

17. The method of claim 13, further comprising:
moving to a storage location corresponding to the storage location name in response to a third touch detected in the at least one widget.

18. The method of claim 13, further comprising:
generating the at least one widget having a setting for the storage location and an environment setting on the touch screen,
wherein the at least one widget, on which the storage location and the environment setting has been reflected, is displayed.

19. The method of claim 13, wherein the storage location and the corresponding storage location name are generated according to at least one of a camera widget and an environment setting of the camera widget.

20. The method of claim 13, wherein the storage location comprises a folder and a path to the folder.

21. The method of claim 20, wherein the displaying of the storage location name comprises displaying the path to the corresponding folder.

22. A portable device comprising:
a touch screen configured to display a widget;
a camera unit; and
a controller configured to:
control the touch screen and the camera unit, to simultaneously display, on the touch screen, a plurality of widgets used for at least one camera function,
wherein each of the plurality of widgets includes a storage location name corresponding to a storage location where an image photographed in a camera application is stored, and at least one widget of the plurality of widgets further includes a camera application button, photograph a subject by using the camera unit and a photographing button in the camera application displayed in response to a first touch detected in the camera application button of the at least one of the plurality of widgets, and store the photographed subject in the storage location corresponding to the at least one widget where the first touch is detected, wherein each widget of the plurality of widgets has a different corresponding storage location and corresponding storage location name.

23. The portable device of claim 22, wherein the controller is further configured to photograph the subject by applying an environment setting, which is set in the at least one widget, to the camera unit.

24. The portable device of claim 22, wherein the storage location and the corresponding storage location name are generated according to at least one of a camera widget and an environment setting of the camera widget.

25. The portable device of claim 22, wherein the storage location comprises a folder and a path to the folder.

26. The portable device of claim 25, wherein the displaying of the storage location name comprises displaying the path to the corresponding folder.

27. A portable device comprising:
a touch screen configured to display a widget;
a camera unit; and
a controller configured to:
control the touch screen and the camera unit, to simultaneously display, on the touch screen, a plurality of widgets used for at least one camera function, wherein each of the plurality of widgets includes a storage location name corresponding to a storage location where an image photographed in a camera application is stored, and at least one widget of the plurality of widgets further includes a preview area which displays a photo image stored in the storage location and a photographing button, change, in response to detecting a first touch in the at least one widget of the plurality of widgets, the preview area of the at least one widget where the first touch is detected to a view finder area, photograph a subject displayed on the view finder area by using the photographing button and the camera unit, and store the photographed subject in the storage location corresponding to the at least one widget where the first touch is detected, wherein each widget of the plurality of widgets has a different corresponding storage location and corresponding storage location name.

28. The portable device of claim 27, further comprising:
a sensor configured to detect rotation of the portable device,
wherein the controller is further configured to rotate the at least one widget in response to the rotation of the portable device detected in the sensor.

29. The portable device of claim 27, wherein the controller is further configured to photograph the subject by applying an environment setting, which has been set in the at least one widget, to the camera unit.

30. The portable device of claim 27, wherein the storage location and the corresponding storage location name are generated according to at least one of a camera widget and an environment setting of the camera widget.

31. The portable device of claim 27, wherein the storage location comprises a folder and a path to the folder.

32. The portable device of claim 31, wherein the displaying of the storage location name comprises displaying the path to the corresponding folder.

33. A method for photographing by using a widget of a portable device, the method comprising:

simultaneously displaying, on a touch screen, a plurality of widgets used for at least one camera function, wherein each of the plurality of widgets includes a storage location name corresponding to a storage location where an image photographed in a camera application is stored, and at least one widget of the plurality of widgets further includes a camera widget button which causes execution of the camera application;

displaying the camera application in response to a first touch detected in the camera widget button of the at least one widget of the plurality of widgets; and photographing a subject by applying an environment setting in response to a second touch detected in a photographing button of the camera application, wherein each widget of the plurality of widgets has a different corresponding storage location and corresponding storage location name.

34. The method of claim 33, wherein the storage location and the corresponding storage location name are generated according to at least one of a camera widget and an environment setting of the camera widget.

35. The method of claim 33, wherein the storage location comprises a folder and a path to the folder.

36. The method of claim 35, wherein the displaying of the storage location name comprises displaying the path to the corresponding folder.

* * * * *